United States Patent
Hase et al.

(10) Patent No.: US 10,216,781 B2
(45) Date of Patent: Feb. 26, 2019

(54) MAINTAINING CROSS-NODE COHERENCE OF AN IN-MEMORY DATABASE OBJECT IN A MULTI-NODE DATABASE CLUSTER

(71) Applicant: Oracle International Corporation, Redwood Shores, CA (US)

(72) Inventors: Sanket Hase, Mountain View, CA (US); Neil MacNaughton, Los Gatos, CA (US); Vivekanandhan Raja, Foster City, CA (US); Atrayee Mullick, Santa Clara, CA (US); Vineet Marwah, San Ramon, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 14/983,496

(22) Filed: Dec. 29, 2015

(65) Prior Publication Data
US 2016/0350352 A1 Dec. 1, 2016

Related U.S. Application Data

(60) Provisional application No. 62/168,692, filed on May 29, 2015.

(51) Int. Cl.
*G06F 12/14* (2006.01)
*G06F 17/30* (2006.01)
(Continued)

(52) U.S. Cl.
CPC ...... *G06F 17/30362* (2013.01); *G06F 12/084* (2013.01); *G06F 12/0868* (2013.01);
(Continued)

(58) Field of Classification Search
CPC .................................................. G06F 17/3048
See application file for complete search history.

(56) References Cited

U.S. PATENT DOCUMENTS 4,782,325 A 11/1988 Jeppsson et al.
5,742,792 A 4/1998 Yanai et al.
(Continued)

FOREIGN PATENT DOCUMENTS

| EP | 2 608 070 A1 | 6/2013 |
| GB | 1 332 631 A | 10/1973 |
| WO | WO2007/078444 A1 | 7/2007 |

OTHER PUBLICATIONS

Wikipedia, Readers-writer lock, https://en.wikipedia.org/w/index.php?title=Readers%E2%80%93writer_lock&oldid=657375918 (Year : 2015).*

(Continued)

*Primary Examiner* — William Spieler
(74) *Attorney, Agent, or Firm* — Hickman Palermo Becker Bingham LLP

(57) ABSTRACT

Techniques are described for maintaining coherency of a portion of a database object populated in the volatile memories of multiple nodes in a database cluster. The techniques involve maintaining a local invalidation bitmap for chunks of data stored in memory in each particular node in the cluster by tracking locks granted by a lock manager. During a pre-loading operation, each given node requests a set of shared locks associated with the chunks of data to be store in the given node's memory. When a request to release one of these shared locks occurs, the in-memory copy of those data items may be invalidated in the node releasing its shared lock.

22 Claims, 15 Drawing Sheets

(51) Int. Cl.
*G06F 12/084* (2016.01)
*G06F 12/0868* (2016.01)
*G06F 12/0875* (2016.01)

(52) U.S. Cl.
CPC ...... *G06F 12/0875* (2013.01); *G06F 12/1466* (2013.01); *G06F 17/30371* (2013.01); *G06F 17/30575* (2013.01); *G06F 2212/1024* (2013.01); *G06F 2212/1052* (2013.01); *G06F 2212/465* (2013.01)

(56) References Cited

U.S. PATENT DOCUMENTS

| | | | |
|---|---|---|---|
| 5,778,430 | A | 7/1998 | Ish et al. |
| 5,870,759 | A | 2/1999 | Bauer et al. |
| 6,009,432 | A | 12/1999 | Tarin |
| 7,149,769 | B2 | 12/2006 | Lubbers et al. |
| 8,433,684 | B2 | 4/2013 | Munoz |
| 8,856,484 | B2 | 10/2014 | Ben-Tsion et al. |
| 9,292,564 | B2 | 3/2016 | Kamp et al. |
| 2003/0014598 | A1* | 1/2003 | Brown ............... G06F 11/1076 711/141 |
| 2005/0055380 | A1 | 3/2005 | Thompson et al. |
| 2005/0165798 | A1 | 7/2005 | Cherkauer et al. |
| 2006/0173833 | A1 | 8/2006 | Purcell et al. |
| 2007/0156957 | A1 | 7/2007 | McHardy et al. |
| 2008/0059492 | A1 | 3/2008 | Tarin |
| 2008/0256250 | A1 | 10/2008 | Wakefield et al. |
| 2008/0281784 | A1 | 11/2008 | Zane et al. |
| 2008/0281865 | A1 | 11/2008 | Price et al. |
| 2009/0265306 | A1 | 10/2009 | Barsness |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Aditya et al. |
| 2012/0173515 | A1 | 7/2012 | Jeong et al. |
| 2012/0323971 | A1 | 12/2012 | Pasupuleti |
| 2013/0060742 | A1 | 3/2013 | Chang |
| 2014/0040218 | A1 | 2/2014 | Kimura et al. |
| 2014/0075493 | A1 | 3/2014 | Krishnan et al. |
| 2014/0337338 | A1 | 11/2014 | Shinn |
| 2015/0067086 | A1 | 3/2015 | Adriaens |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2016/0026684 | A1 | 1/2016 | Mukherjee et al. |
| 2016/0350363 | A1 | 12/2016 | Raja et al. |
| 2017/0109384 | A1* | 4/2017 | Zhu .................. G06F 17/30 |

OTHER PUBLICATIONS

Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
Raja, U.S. Appl. No. 14/983,481, filed Dec. 29, 2015, Notice of Allowance, dated May 1, 2018.
U.S. Appl. No. 14/337,179, filed 074/21/2014, Notice of Allowance, dated Jul. 29, 2015.
U.S. Appl. No. 14/337,179, filed Jul. 21, 2014, Office Action, dated Dec. 29, 2014.
U.S. Appl. No. 14/337,179, filed Jul. 21, 2014, Notice of Allowance, dated Nov. 3, 2015.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.

* cited by examiner

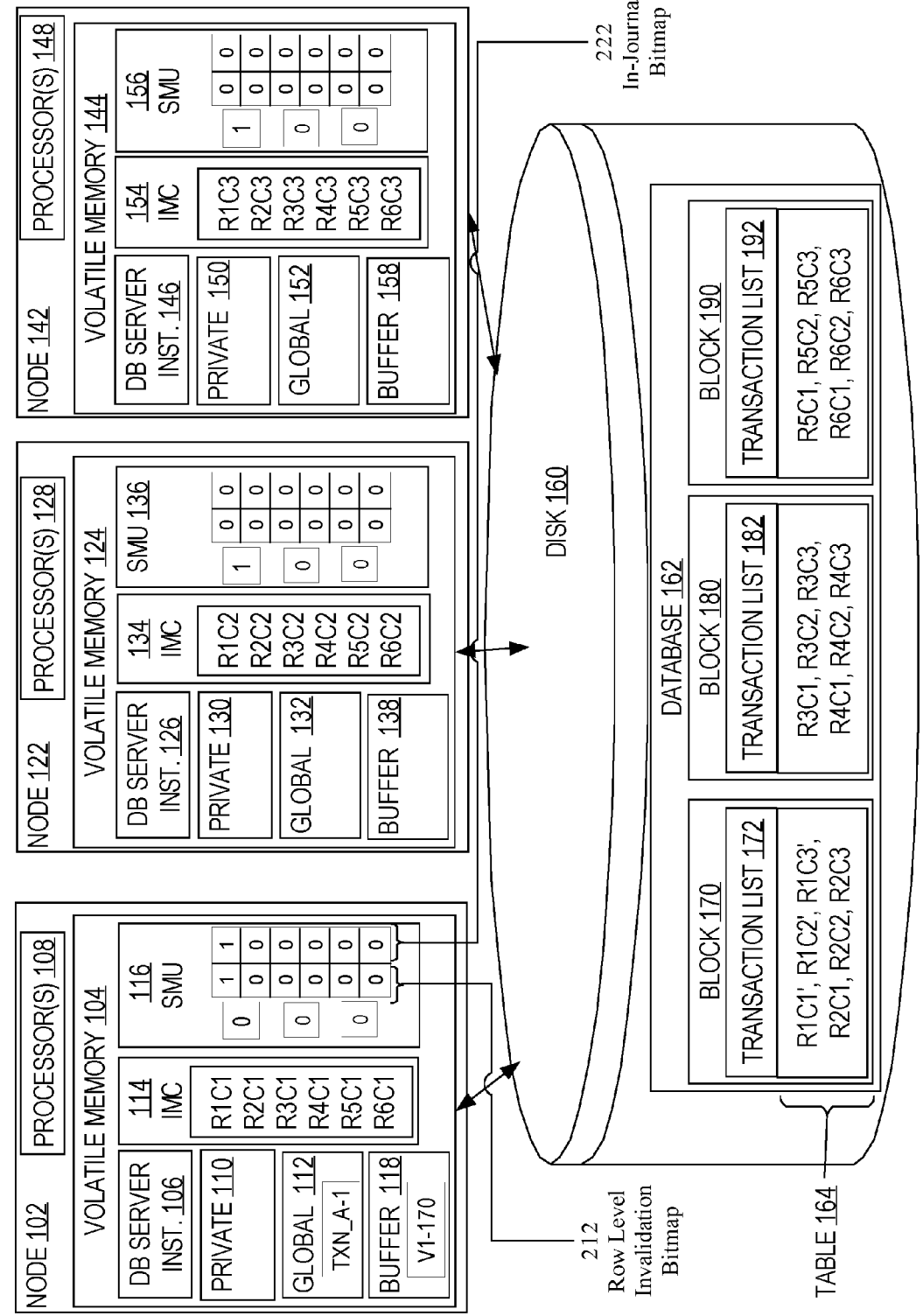

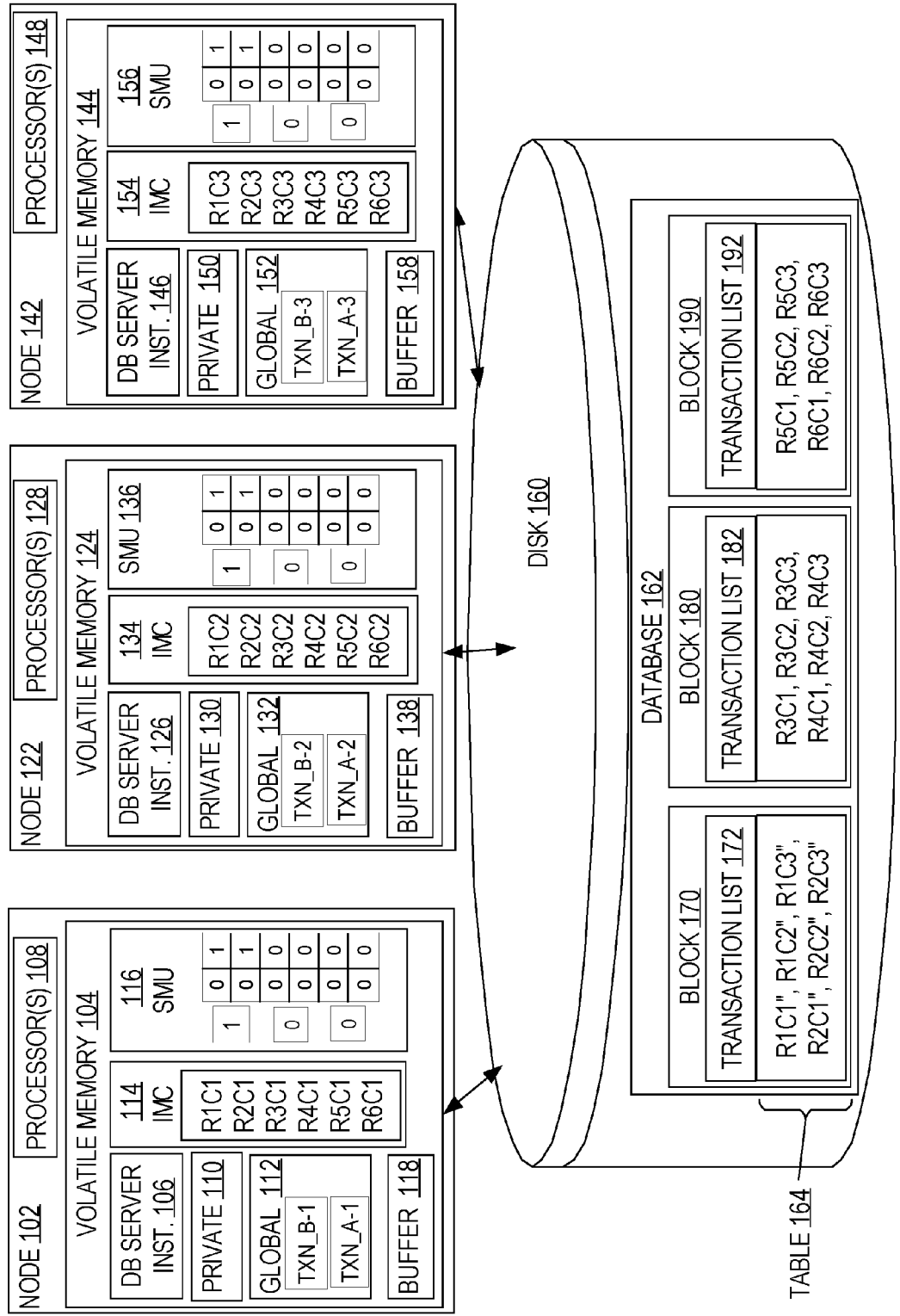

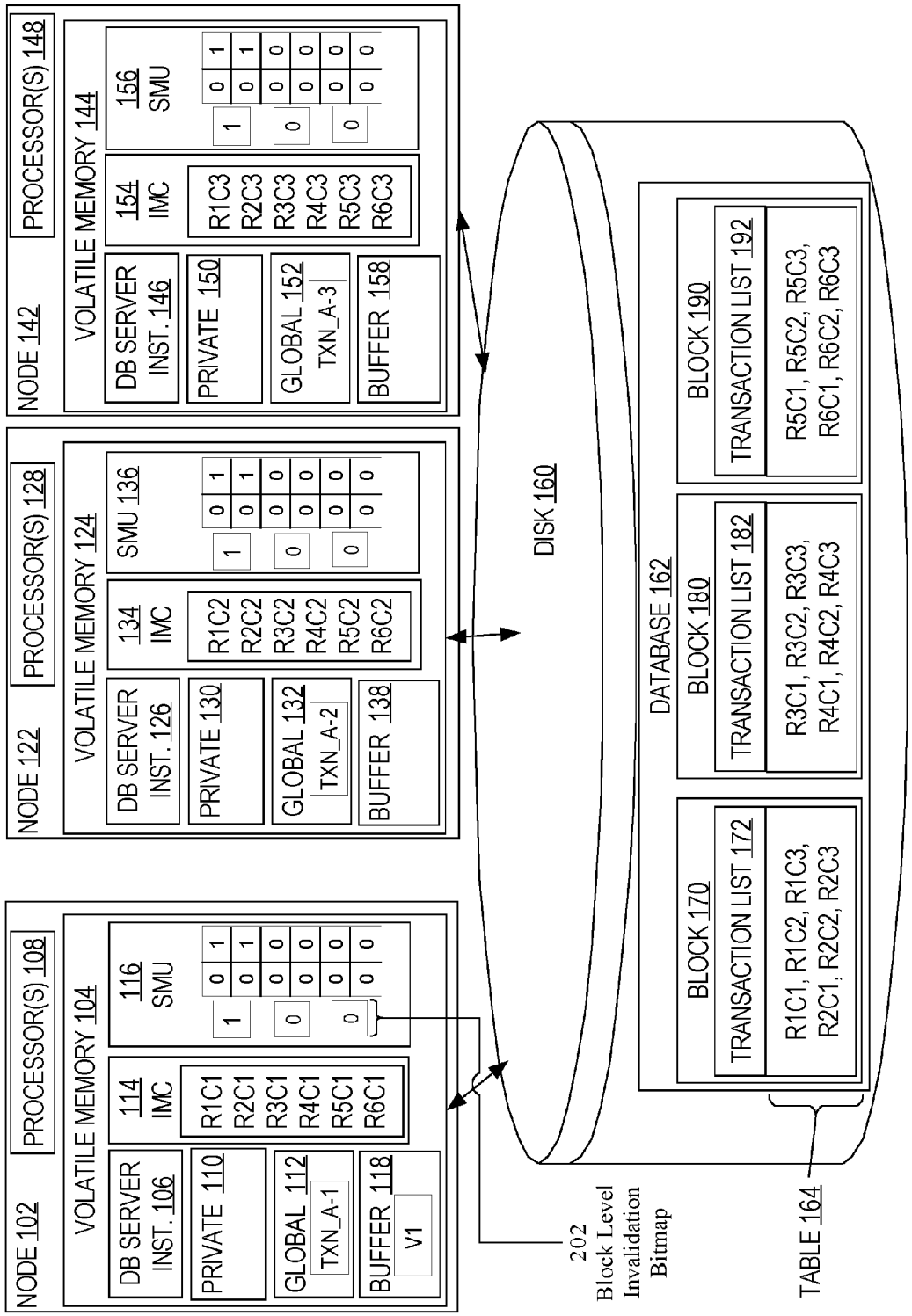

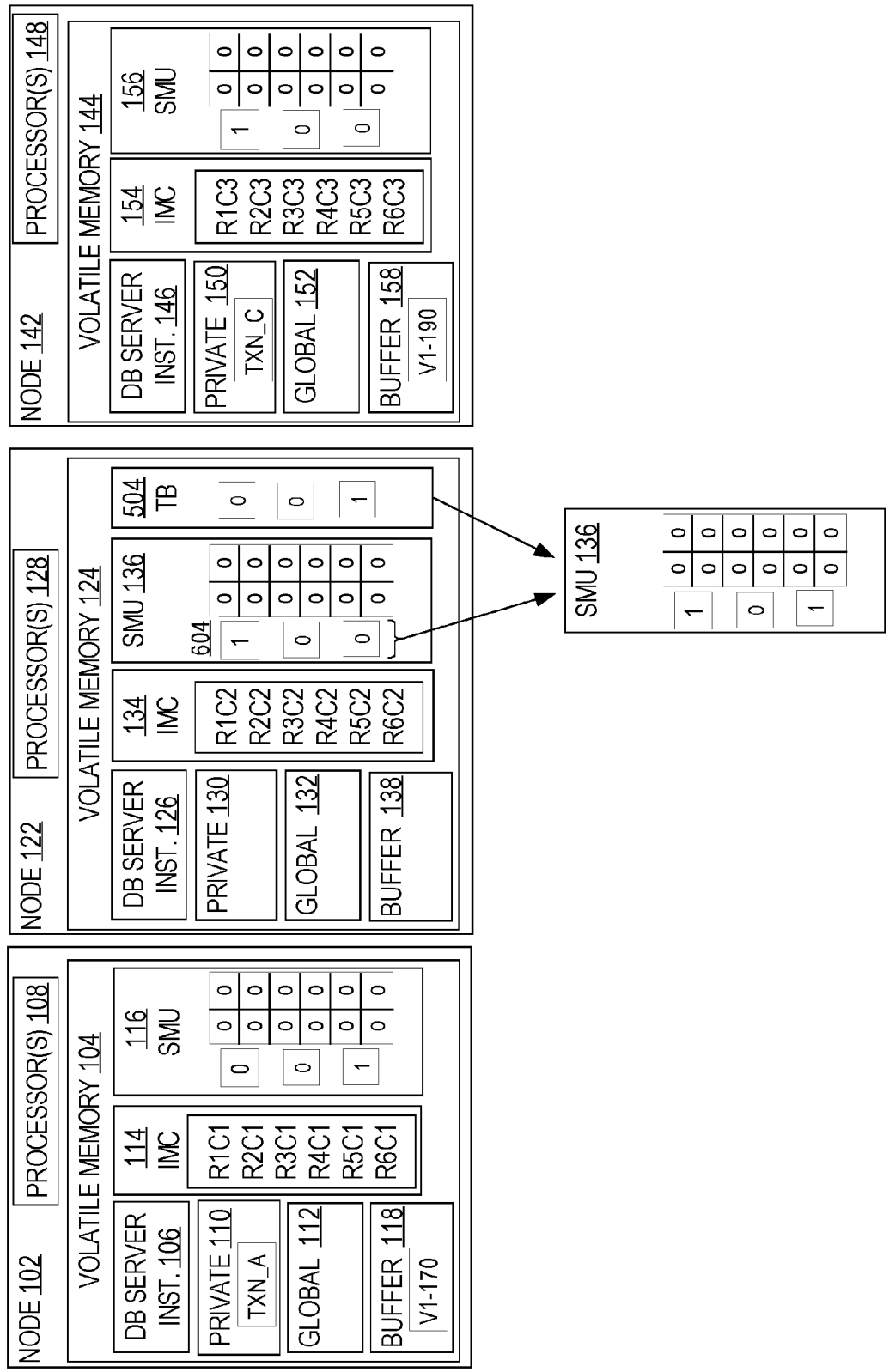

MAINTAINING CROSS-NODE COHERENCE OF AN IN-MEMORY DATABASE OBJECT IN A MULTI-NODE DATABASE CLUSTER

CROSS-REFERENCE TO RELATED APPLICATIONS; BENEFIT CLAIM

This application claims the benefit of Provisional Appln. 62/168,692, filed May 29, 2015, the entire contents of which is hereby incorporated by reference as if fully set forth herein, under 35 U.S.C. § 119(e).

FIELD OF THE INVENTION

The present invention relates to data storage and retrieval techniques in a database, and more specifically to improved computer-implemented techniques for maintaining cross-node coherence of an in-memory database object in a multi-node database cluster.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be pre-loaded into volatile memory. Various approaches for loading entire database objects, or selected portions thereof, into volatile memory to speed up database operation processing are described in U.S. patent application Ser. No. 14/377,179, entitled "Mirroring, In Memory, Data From Disk To Improve Database operation Performance", filed Jul. 21, 2014, referred to herein as the "Mirroring" application, the contents of which is incorporated herein in its entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. An in-memory version or copy of an object (or selected portions thereof), is referred to herein as an In-Memory-Copy (IMC). The set of data that is copied from disk into volatile memory to create an IMC is referred to herein as a "chunk".

When a node commits a transaction that changes data in a chunk, the change becomes permanent and must be visible to all nodes that use that data. Thus, when executing a subsequent transaction with a snapshot time after the commit time of the transaction that made the change, any remote node that accesses the IMC for that data should immediately use the changed data. This concept is referred to herein as coherency. Maintaining coherency across multiple nodes is difficult in a dual format database because data as stored on disk does not directly map to how data is stored in volatile memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2B is a block diagram illustrating a database cluster updating the current version of a database object distributed across the volatile memories of multiple nodes immediately after a modifying transaction has been committed;

FIG. 3D is a block diagram illustrating a database cluster with a current version of a database object distributed across the volatile memories of multiple nodes after an exclusive lock for a portion of the database object has been released and the corresponding data has been written to disk;

FIG. 4 is a block diagram illustrating a node in a database cluster making local invalidations to a portion of database object distributed across the volatile memories of multiple nodes after the space allocated in a private journal for a particular transaction has been exceeded;

FIG. 5B is a block diagram illustrating a particular node in a database cluster creating and merging a temporary bitmap with an SMU to record invalidations to a portion of database object distributed across the volatile memories of multiple nodes after two other nodes in the database cluster are performing modifying transactions on different portions of the database object contained in the volatile memory of the particular node;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for maintaining coherency in a dual format database. A database object (i.e. a table) or portions thereof (i.e. chunks) may be stored as in-memory copies across multiple nodes, and may be stored in a centralized persistent storage copy. A persistent storage copy of table is physically organized as "blocks" of one or more contiguous rows in row-major format. In-memory copies of chunks from the table are stored as one or more columns from one or more of these blocks in column-major format. Because the contents of a block may be distributed to more than one node, updating a particular block creates a coherency issue.

In the preferred embodiment, a host node acquires shared locks that cover the blocks containing a particular chunk to be loaded from persistent storage. An IMC is then generated from that particular chunk, and these shared locks are maintained even after IMC generation is complete. While holding a shared lock for a particular block, the host node has permission to read IMC data that has been generated from that particular block. To modify IMC data, the host node must obtain an exclusive lock.

If the host node requests an exclusive lock, all corresponding shared locks held by other host nodes must be released. When a particular host node releases one or more shared locks, the IMC data that was covered by those shared locks is invalidated. The IMC may then contain some data items that are valid and some data items that are invalid. When the host node is required to read data items that belong to the particular chunk, the host node obtains data items that have not been invalidated from the IMC, and the host node obtains data items that have been invalidated from another source.

System Overview

Figure 1:
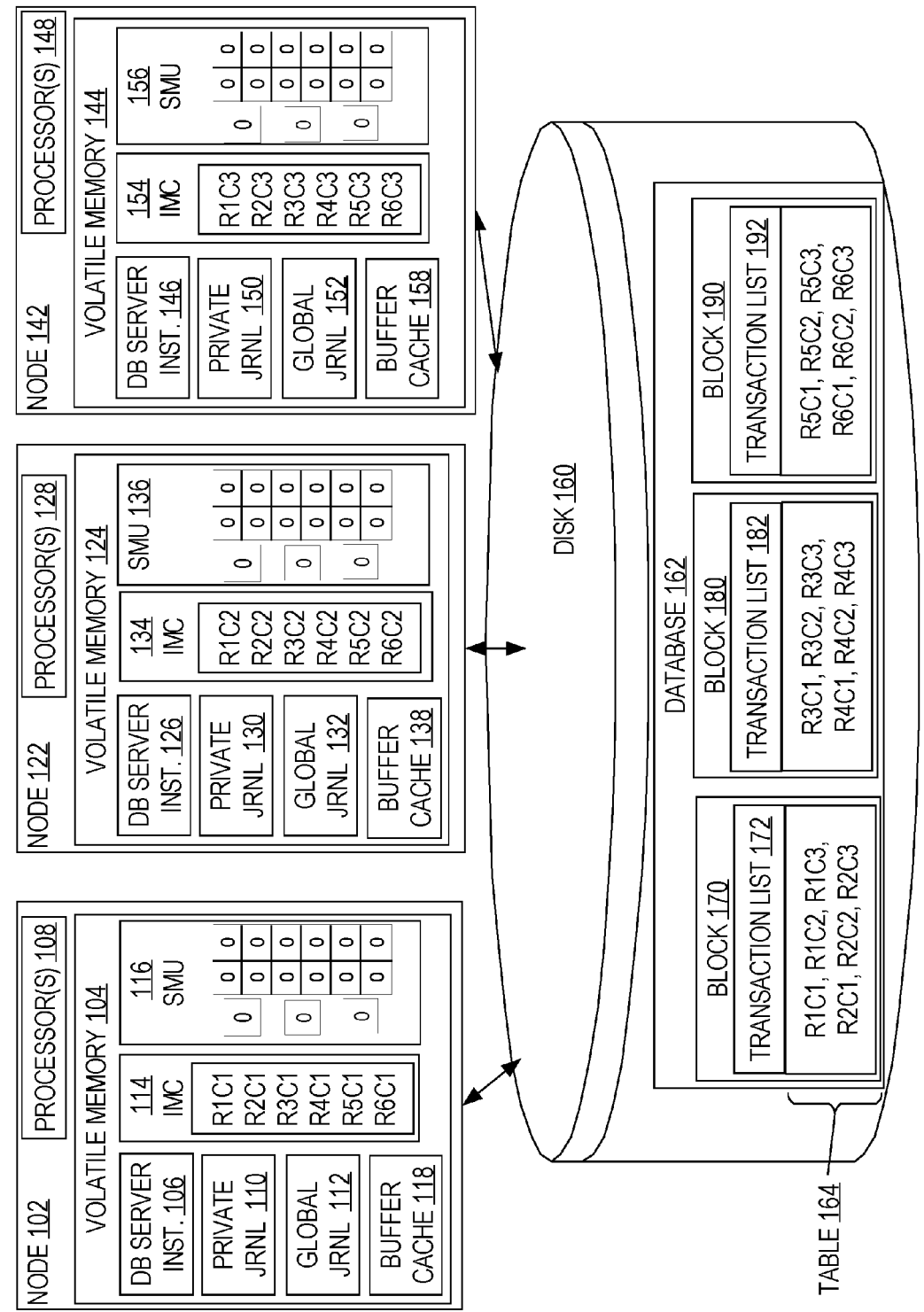
FIG. 1 is a block diagram illustrating a database cluster with a current version of a database object distributed across the volatile memories of multiple nodes.

Referring to FIG. 1, database cluster 100 has three nodes 102, 122 and 142. Nodes 102, 122 and 142 respectively have one or more processors 108, 128 and 148, and local volatile memory 104, 124 and 144. In addition, nodes 102, 122 and 142 are respectively executing database server instances 106, 126 and 146. While in the illustrated embodiment each node is executing a single database server instance, in alternative embodiments a single node may execute more than one database server instance.

Database server instances 106, 126, 146 execute database commands that are submitted to a database server by one or more database applications (not shown). The data used by those applications is primarily in database 162.

Database 162 contains database objects such as table 164. Table 164 includes three columns c1-c3, and six rows r1-r6 for a total of eighteen data items shown as: R1C1, R1C2, R1C3, R2C1, R2C2, R2C3, R3C1, R3C2, R3C3, R4C1, R4C2, R4C3, R5C1, R5C2, R5C3, R6C 1, R6C2, and R6C3. Although the data items are logically arranged in a table when viewed by a user, in the embodiment illustrated in FIG. 1, data items for table 164 are stored as row-major blocks 170, 180, 190 on disk 160. Each block 170, 180, 190 contains a transaction list 172, 182, 192 for storing the most recent updates to data items in that block.

Block 170 stores data items R1C1, R1C2, R1C3, R2C1, R2C2, R2C3 as well as a transaction list 172 for block 170

Block 180 stores data items R3C1, R3C2, R3C3, R4C1, R4C2, R4C3 as well as a transaction list 182 for block 180

Block 190 stores data items R5C1, R5C2, R5C3, R6C1, R6C2, R6C3 as well as a transaction list 192 for block 190

Each of nodes 102, 122 and 142 is able to independently access any block 170, 180, 190 of table 164. After accessing a particular block, the block may be cached in a local buffer cache 118, 138, 158. It is much faster for any given database server instance to access data items of table 164 from blocks that are stored in its local volatile memory. If a node updates a block and the modifications to that block are not reflected on disk 160, that particular buffer cache is referred to as "dirty." If the node has a copy of a block in a local buffer cache and the copy of the bock is the same as the on-disk copy, then the buffer cache is said to be "clean."

For the purpose of illustration, database 162 is shown as stored on a single shared disk 160, but in alternative embodiments, database 162 may be spread across multiple disks to which each of nodes 102, 122 and 142 have access.

Journals and SMUS

Each database operation is tracked in a private journal (110, 130, or 150) as part of a transaction. A transaction is a sequence of database operations that are treated as a single unit. Using the private journal, a node may track transaction-specific changes to a table. The transaction is able to see all transaction-specific changes that are applied to the table, but no other transactions can see those changes until the transaction commits. For example if node 102 is tracking a transaction, private journal 110 is only accessible by node 102 until commit.

Once the transaction commits, the aggregate changes are pushed to a corresponding global journal. Global journals (112, 132, and 152) are sharded to correspond with in-memory data. Rather than updating an IMC for every committed transaction that modifies an IMC, the aggregate changes are stored in a corresponding global journal. Storing the data in an additional data structure avoids the overhead of decompressing and re-compressing the IMC.

To ensure that each node is aware of the IMC data that is no longer valid, each IMC has a corresponding SMU (116, 136, 156) that provides a bitmap of which portions of the IMC are invalid. In the example in FIG. 1, the first column of an SMU indicates whether a block in the corresponding IMC is invalid. The second column indicates whether a row in the corresponding IMC is invalid. The third column indicates whether additional transaction data corresponding to a row may be found in a corresponding journal.

Requesting Access to Data Blocks

According to one embodiment, permission to access data blocks in database 162 is managed through a lock system. When a node requires access to a block, the node requests read access to the block from a node that has been designated to be the "lock manager" for that block. The lock manager responds by sending a read lock to the requesting node. The read lock grants the requesting node permission to read data items from the block, while not excluding other nodes from requesting other read locks for that block.

The node that manages the locks for a particular set of blocks is the lock manager for that set of blocks. According to one embodiment, a set-of-blocks-to-lock-manager mapping is maintained so that, given a specific block identifier, any node in the cluster 100 is able to determine the lock manager for any set of blocks.

For example, in database cluster 100, assume node 102 is the lock manager for a range of blocks that includes all of the blocks in table 164. Under these circumstances, the set-of-blocks-to-lock manager mapping would map the identifier for blocks 170, 180, and 190 to node 102.

Local and Global Locks

According to one embodiment, locks may be granted in a "local" mode or a "global" mode. Initially, when a lock manager for a block grants a node permission to access a block, the lock manager grants a local lock. A node with a local lock may read, modify, or commit a modified block to persistent storage without requesting permission from the appropriate lock manager. However, if a block is modified and transferred to another node's cache before being written to persistent storage, then the mode for the lock is converted from local to global. The lock manager maintains a queue of write requests by nodes holding global locks.

For more information on local versus global locks see U.S. patent application Ser. No. 13/205,443 filed Aug. 8, 2011, "Methods to Perform Disk Writes in a Distributed Shared Disk System Needing Consistency Across Failures," inventors Shashikanth Chandrasekaran et al., Attorney Docket No. 50277-3902, referred to herein as the "Disk Writing" application, the entire contents of which is hereby incorporated by reference as if fully set forth herein.

Fine-Granularity Locks

In the embodiments described below, the database server grants locks on a per-block basis. However, in systems where the lock master manages locks with a finer granularity, the techniques described herein may also be performed at a finer granularity. For example, in a system where the lock manager controls access to locks over rows within a table, the lock manager grants these row level locks to requesting nodes rather than block level locks.

Generating in-Memory Copies

In some embodiments, IMCs are generated in a plurality of host nodes in a database cluster. For example, table 164 may be distributed across the volatile memories of the nodes 102, 122, 142 in the cluster 100 by generating IMCs for different chunks of table 164 in different nodes. To start IMC generation, node 102, referred to as a "load operation master", may initially request from the appropriate lock manager an exclusive lock for blocks 170, 180, 190. The load operation master (i.e. node 102) divides the table 164 into distinct portions and then sends a message of consistency information to the nodes 102, 122, 142 in the cluster 100. Using the consistency information, each node determines which distinct portions of table 164 to pre-load into its volatile memory. The node that is assigned to pre-load a chunk is referred to herein as the host of the chunk. The chunks of table 164 may be assigned in a manner that distributes the chunks across the volatile memories 104, 124, 144 of nodes 102, 122, 142. For the purpose of explanation, it shall be assumed that each chunk contains values from a single column of table 164, though chunks may contain values from many columns. Specifically, it shall be assumed that:

Node 102 is assigned to host a chunk that contains all values from column C1, which includes data items R1C1, R2C1, R3C1, R4C1, R5C1, R6C1

Node 122 is assigned to host a chunk that contains all values from column C2, which includes data items R1C2, R2C2, R3C2, R4C2, R5C2, R6C2

Node 142 is assigned to host a chunk that contains all values from column C3, which includes data items R1C3, R2C3, R3C3, R4C3, R5C3, R6C3

After the load operation master has sent the consistency information to the nodes, the load operation master downgrades the exclusive lock to a shared lock. Each node assigned to host a chunk then obtains from the appropriate lock manager a shared lock for any blocks that belong to the chunk that they have been assigned to host. The nodes may then independently read their assigned chunks autonomously and in parallel.

In the example embodiment illustrated in FIG. 1, the blocks 170, 180, 190 store data items from table 164 in row-major format. However, the data items from table 164 have been divided into chunks based on the columns. Because each block contains at least one data item from each column, the chunk assigned to each node 102, 122, 142 has some data items in each block 170, 180, 190. Assuming node 102 is the lock manager for a range of blocks that include all of the blocks in table 164, each node 102, 122, 142 obtains a shared read lock from node 102 for each of the blocks 170, 180, 190. Because these locks are shared read-only locks, all of the nodes 102, 122, 142 have access to all of the blocks 170, 180, 190 for pre-loading.

Additional details about parallel loading operations are provided in U.S. patent application Ser. No. 14/565,906, entitled "DISTRIBUTION OF AN OBJECT IN VOLATILE MEMORY ACROSS A MULTI-NODE CLUSTER", filed Dec. 10, 2014 which is incorporated herein by this reference.

Maintaining Shared Locks for IMCS

The lock manager grants each host node one or more shared locks during IMC generation operation. As will be describe in greater detail hereinafter, once a shared lock for generating an IMC is granted, the shared lock is also used for subsequent operations.

Performing a Read Operation in a Dual Format Database

When a node receives a database operation, the work for the database operation is broken into granules and distributed to nodes based on a map of how the data is distributed to the IMCs. The work for each granule is performed against data stored in the IMCs local to the database server instance performing the work. Any data item not located in an IMC because it is invalid may be read from disk or a local buffer cache. The results of these small work granules are aggregated in the node that originally received the database operation, and sent back to the requesting user or application.

If the database operation only requires reading data, the node that received the database operation may simply use the already-granted shared lock to read the IMC. FIG. 1 is a block diagram illustrating a database cluster with current (fresh') data in all IMCs. Shared locks for blocks 170, 180, and 190 were obtained from the lock manager (i.e. node 102) to pre-load data items into IMCs 114, 134, 154. After loading the data items, the same shared lock is used as a permission for reading data items from the IMCs. For example, after receiving a read request to SELECT a row with the value K in column C1 from table 164, node 102 may first find rows with the value K in column C1 using local IMC 114 and then break the database operation into work granules to reconstruct the blocks with the rows that contains the value K. The work required by the database operation is spread across one or more nodes and performed locally in each node against data located in each hosted IMC 114, 134, 154. The results are aggregated in node 102 and sent back to the requesting user application.

Performing a Write Operation in a Dual Format Database

When a node 102 receives a database operation such as an UPDATE statement from a particular client that changes data in block 170, node 102 writes this change to private journal 110. When node 102 receives another UPDATE statement from the client that changes data in block 170, node 102 also writes this change to private journal 110 as belonging to the same transaction. The transaction is able to see all transaction-specific changes that are applied to the table, but no other transactions can see those changes until the transaction commits. The modifying transaction may make further changes to the table or even roll back the changes to the table made in that transaction without affecting how other transactions perceive the current state of the table in the database.

A commit ends a transaction, making all changes permanent and viewable by other transactions. A commit is atomic, meaning after commit either all of the database operations in the transaction occur, or nothing occurs (i.e. when a portion of the transaction fails to commit).

During a modifying transaction, but before commit, a node may modify tables based on database operations specified by the transaction only after obtaining an exclusive lock. Requesting an exclusive lock indicates an intent to modify a table, even if the changes made by the transaction are never committed. The exclusive lock is requested from the lock manager, and the lock manager requests that other nodes release their shared locks before granting the requesting node the exclusive lock.

For example, when a node 102 receives a database operation such as an UPDATE statement that changes the data in a specific block 170, node 102 requests an exclusive lock for block 170 by sending a request to the lock manager (i.e. node 102). In response to receiving the request, the lock manager (i.e. node 102) sends a message to the other nodes (i.e. node 122, 142) to release their shared locks. After receiving a confirmation, the lock manager (i.e. node 102) grants the exclusive lock to the requesting node 102.

Exclusive Lock is a Cache Fusion Lock

According to one embodiment, the exclusive lock that grants permission to modify data items from one or more blocks is also a cache fusion lock. A cache fusion lock is a lock that includes a requirement to maintain state information (i.e. a version and/or a transaction list) of a set of data even after the node transfers the exclusive lock to another node. A reference to the node holding the exclusive lock is stored in the lock manager.

Any node may request the most current version of the data covered by a cache fusion lock. When the lock manager receives a request for an exclusive lock on one or more blocks pre-loaded into one or more IMCs, the lock manager may either (1) send a request to all the shared lock holders to release their shared locks or (2) send a request to the current holder of an exclusive lock to transfer the exclusive lock to the requesting node.

Figure 2A:
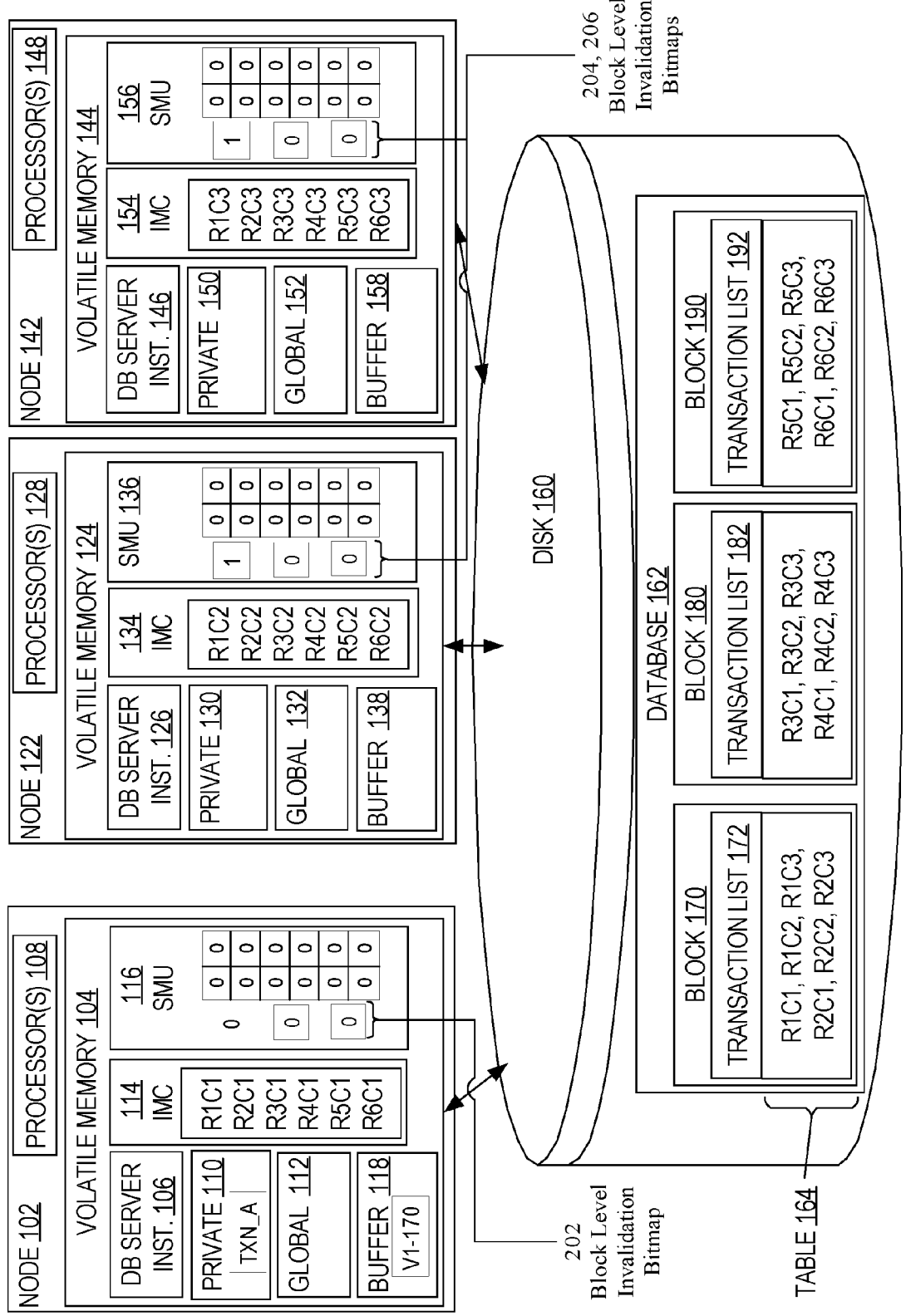
FIG. 2A is a block diagram illustrating a database cluster invalidating portions of a database object distributed across the volatile memories of multiple nodes after a node obtains an exclusive lock on the portions of the object.

If a current version of the data is covered by shared locks, the shared lock holders may send their portions of data protected by the locks to the requesting node along with releasing their shared locks. FIG. 2A is an example of the state of a cluster after a node obtains an exclusive lock on a set of data. Node 102 requests the exclusive lock for block 170 and loads buffer cache 118 with data (i.e. V1-170) from IMCs 114, 134, 154 corresponding to block 170. Private journal 110 tracks the transaction TXN_A that changes data from block 170 to version V1-170.

Figure 3A:
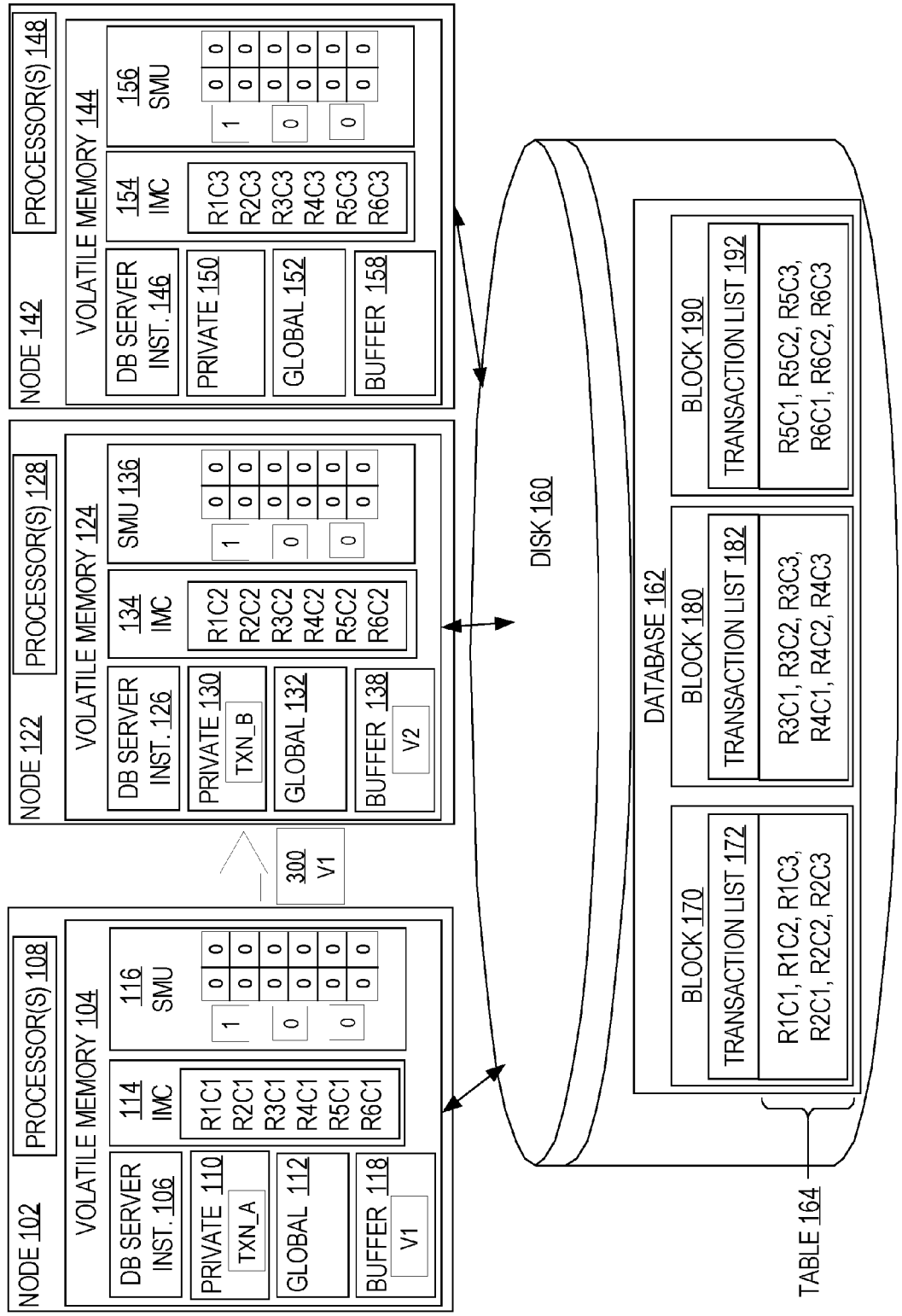
FIG. 3A is a block diagram illustrating a database cluster invalidating a portion of a database object distributed across the volatile memories of multiple nodes after a first node in the cluster transfers the portion of the database object to a second node's buffer cache.

If a node requests an exclusive lock for data that is already covered by another exclusive lock, the previous exclusive lock holder sends the current version of the data to the requesting node along with the exclusive lock for that data. The first transfer of data from one buffer cache to another buffer cache may require the transfer of a large amount of data (i.e. an entire set of one or more blocks). The transfer of a large amount of data is referred to herein as a "hard ping." A hard ping may result in an invalidation. FIG. 3A illustrates a system image of cluster 100 after hard ping 300 of data from node 102 to node 122. Node 102 has an invalidation recorded in SMU 116 corresponding to block 170 because the modified block V1 was transferred from node 102 to node 122. Node 122 has begun a second modifying transaction TXN_B that modifies data originating from block 170. A second version V2 of block 170 now exists in buffer cache 138. The operations that modify V1 to V2 are stored in private journal 130 under transaction TXN B.

The node 102 that transfers the data to the requesting node 122 also retains state information of the data in buffer cache 118 such as a "past image" of the data and/or the transaction list associated with the data. The state information of the data may be stored in a buffer cache until it is no longer desirable to have the data in the buffer cache. For example, the data contain in V1 may be retained in buffer cache 118 until a more current version (i.e. V2) of block 170 has been written to disk 160 and the space in the buffer cache 118 needs to be used for another block.

Figure 3B:
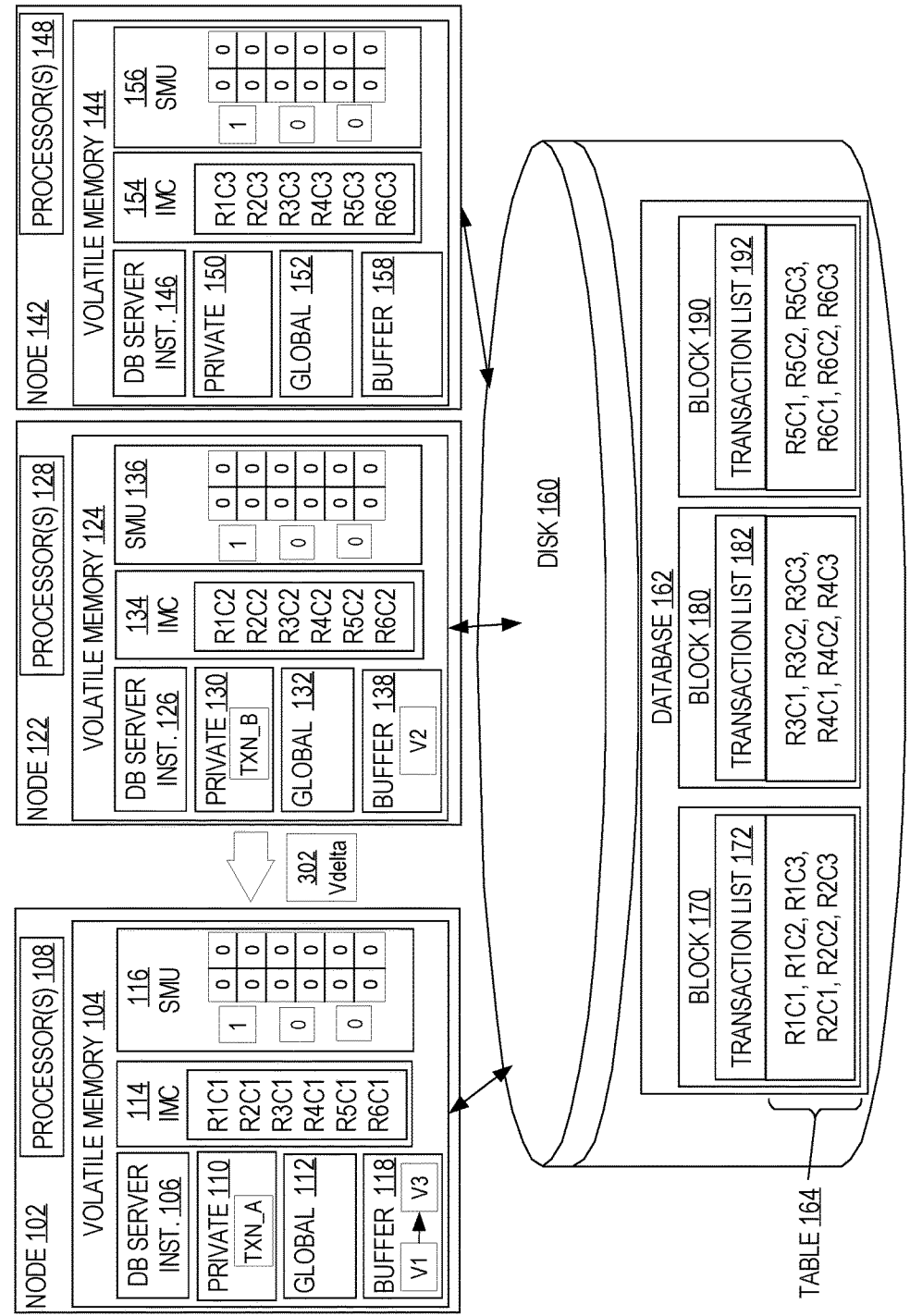
FIG. 3B is a block diagram illustrating a database cluster after a second node in the cluster transfers version changes of a portion of a database object back to the first node's buffer cache.

However, if the node 102 holding a past image (i.e. V1) requests an exclusive lock for data when a past version of the data already resides in that node's local buffer cache 118, the node 122 that holds the current version of the data only needs to transfer the differences between the past image (i.e. V1) and the current version of the data (i.e. V2). Transferring the differences between the current version and the past image is referred to herein as a "soft ping." FIG. 3B illustrates a system image of cluster 100 after a soft ping 302 from node 122 to node 102. Only the differences between V1 and V2 (i.e. $V_{delta}$) are transferred to node 102 from node 122. In this example, V1 and V3 were created by the same transaction TXN_A, which is still being recorded in private journal 110.

A separate process is used to write to disk any version of the data locked in the individual buffer caches. The lock manager keeps track of the most recent version of data written-to-disk, so a past version is not used to overwrite a more recent version of the data. For more information, see the Disk Writing application described above.

Releasing the Shared Locks Causes Invalidations

The shared locks grant permission to access data items or blocks stored in one or more IMCs, while the exclusive lock grants permission to create a different version of a set of one or more blocks.

When a node releases a shared lock, so another node may obtain an exclusive lock, the data items in the corresponding IMC that were covered by that shared lock are marked as invalid. In response to receiving a request to release a shared lock, the remote node that received the request invalidates the associated block using a local SMU. For example, node 122 and node 142 release their shared locks to create the system image of cluster 100 illustrated in FIG. 2A.

After node 122 releases a shared lock for block 170, node 122 marks the corresponding block (i.e. block 170) as invalid in bitmap 204 contained in SMU 136 for IMC 134

After node 142 releases a shared locks for block 170, node 142 marks the corresponding block (i.e. block 170) as invalid in bitmap 206 contained in SMU 156 for IMC 154

The locks managed by the lock manager (i.e. node 102) could be managed at the row level or even the data item level rather than the block level. However, a preferred embodiment employs locks at the block level. Thus, for the purpose of explanation, the examples given hereafter will be given in the context of systems that use block-level locks for controlling resource consistency among multiple nodes. Consequently, most examples will illustrate invalidations recorded at the block level. However, the techniques described herein are not limited to that context. For example, if the lock manager grants row level locks, then the release of such a lock would cause invalidation of a row.

In some embodiments, the SMUs contain multiple granularities of invalidation bitmaps. For example, node 102 has an SMU 116 with a block level invalidation bitmap 202 (referenced in FIG. 2A) and a row level invalidation bitmap 212 (referenced in FIG. 2B). The different bitmaps may also be referred to as bit vectors. According to one embodiment, invalidations in the larger granularity bitmaps do not need to be propagated to the smaller granularity bitmaps because the larger granularity bitmaps are always read first. For example, when an invalidation is recorded at the block level in bitmap 202, the row level invalidations do not need to be recorded in bitmap 212. In an alternative embodiment, all invalidations are recorded at all levels to which they apply. Thus, a block level invalidation in bitmap 202 would be propagated to the corresponding rows in bitmap 212.

Handling Database Operations after an Invalidation

IMCs 114, 134 and 154 are only useful if used to improve the performance of database operations that access table 164. Therefore, according to one embodiment, a database server instance in cluster 100 responds to a database operation that targets data from table 164 by breaking the operation requested by the database operation into work granules, and distributing those granules based on which node/database server instance is hosting the targeted data.

Assume that database server instance 106 receives a database operation to scan an entire table 164. In response, database server instance 106 creates a first set of one or more work granules to scan the data that resides in IMC 114, a second set of one or more work granules to scan the data that resides in IMC 134, and a third set of one or more work granules to scan data that resides in IMC 154.

Each node executes the work granules assigned to it, taking advantage of its local in-memory copy of the data items that it is hosting. For any data items that cannot be read in the local IMC because they are marked as invalid in the corresponding local SMU, and they are not available in the corresponding journal, the database server instance retrieves that data from a local buffer cache if possible or from disk if a useful version of the data is not located in a local buffer cache. For example, data items from IMCs 134, 154 are marked as invalid in SMUs 136, 156 respectively at respective block level invalidation bitmaps 204, 206. These data items are read from local buffer caches 138 or 158 if a version of the data, that resides in a local buffer cache, is current as of the database operation execution time. Alternatively, the data items may be read from disk 160.

After performing the work assigned by their respective work granules, each node 102, 122, 142 provides its results back to the node 102 that received the database operation, and that node provides the results back to the database application that issued the database operation.

Downgrade Mode

A node tracks each database manipulation language statement (DML) as associated with a specific transaction in the node's local private journal. As previously mentioned, transactions can be rolled forward or back using the private journal.

In some embodiments, memory allocated for a single transaction in a local private journal may be limited. Nodes tracking extra-long transactions may switch to a downgrade mode for storing transaction-specific data. In downgrade mode, the node pushes the most recent changes normally stored in the private journal to a set of sharded global journals distributed across the cluster. Thus, global journals 112, 132, 152 may store uncommitted changes after the volatile memory allocated for a single transaction in a local private journal has been exceeded. FIG. 4 illustrates a node operating in downgrade mode. Transaction TXN_A that was previously being tracked in private journal 110 is now tracked in three global journals 112, 132, 152 as TXN_A-1, TXN_A-2, and TXN_A-3 respectively.

When a change to data located in an IMC is pushed to the global journals because a node is operating in downgrade mode, the node recording the transaction information marks the corresponding block or data item as invalid in the corresponding SMU. For example, in FIG. 2A, node 102 has an exclusive lock for modifying data located in a local IMC 114 but does not record an invalidation in SMU 116 because all of the modifications are stored in private journal 110. In contrast, in FIG. 4 node 102 is performing the same database operations but transaction information is distributed across global journals 112, 132, 152. Node 102 cannot obtain table data by pulling transaction-specific data from the local private journal 110. Thus, node 102 in FIG. 4 has an invalidation recorded at the block level bitmap 202 (corresponding to block 170) in SMU 116.

Latchless Invalidation for Releasing a Shared Lock

In some embodiments, multiple processes may be vying for use of the same invalidation bitmap. In a first scenario, one node may be using the block level invalidation bitmap locally in order to operate in downgrade mode, while another node is attempting to obtain an exclusive lock for data in the same IMC. For example, assume node 122 in FIG. 3A requests an exclusive lock for block 170 at the same time that node 102 switches to downgrade mode as in FIG. 4. Node 102 must record invalidations in SMU 116 for two separate processes. In a second scenario, two separate nodes may request exclusive locks for different blocks, but both blocks are contained in the IMC of a single remote node. For example, assume node 142 requests an exclusive lock (not shown) for block 190 at the same time node 102 is requesting an exclusive lock for block 170 as in FIG. 2A. Node 122 receives two notifications to release two separate locks from the lock manager (i.e. node 102), and node 122 must record both of those invalidations in SMU 136 at the same time before releasing the locks.

According to one embodiment, a node receiving an instruction to release a shared lock does not wait for the local block level bitmaps to become free before releasing the shared lock. Instead, the node creates a temporary bitmap indicating which blocks should be made invalid. Then the node holding the shared lock may immediately release its shared lock, and other processes for writing data to a block may continue unimpeded. After the local block level bitmap becomes free, the invalidations from the temporary bitmap are propagated to the corresponding bitmap into the local SMU. This process speeds up the response time of the lock daemons running on each node.

Figure 5A:
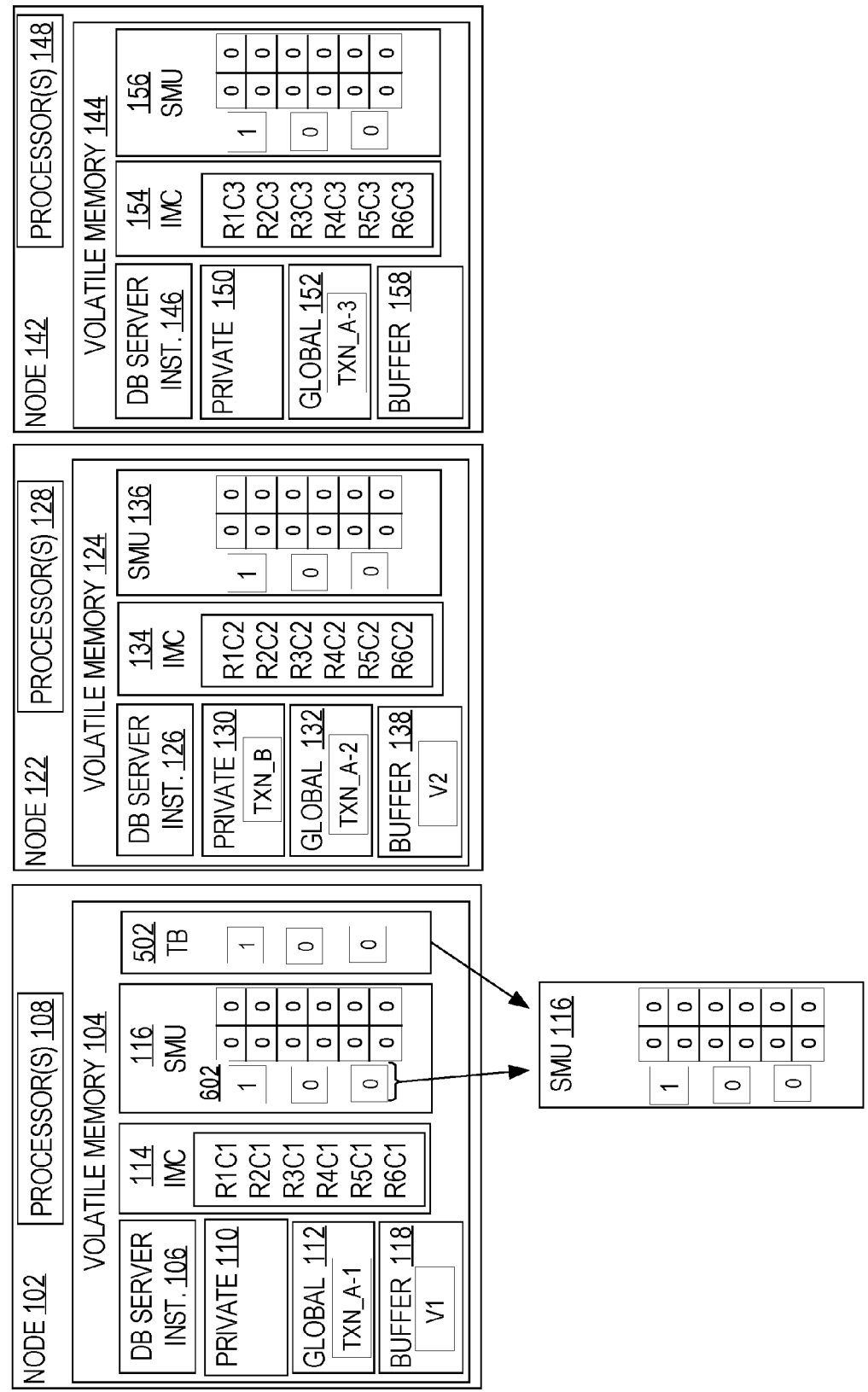
FIG. 5A is a block diagram illustrating a node in a database cluster creating and merging a temporary bitmap with an SMU to record invalidations to a portion of database object distributed across the volatile memories of multiple nodes after the space allocated in a private journal for a particular transaction has been exceeded and the portion of the database object has been transferred to another node's buffer cache for modification.

FIG. 5A is a block diagram illustrating a node with an SMU data structure and a temporary bitmap created for recording invalidations caused by releasing a shared lock. In this example, a node 102 is performing a local invalidation in downgrade mode for a block while another node 122 is attempting to gain an exclusive lock for that block. Rather than waiting for the local process to finish, node 102 creates a temporary transition bitmap 502 for the same blocks as block level bitmap 202. Node 102 records the invalidation of block 170 in the temporary bitmap 502 and releases its shared lock, even though the downgrade process is recording the invalidation of block 170 in the block level bitmap of SMU 116. After the downgrade mode invalidation is complete, node 102 takes the union of the two bitmaps 202, 502 and records the union in SMU 116.

FIG. 5B is a block diagram illustrating a node with an SMU data structure and a temporary bitmap created for recording invalidations caused by releasing a shared lock. In this example, a node 122 is performing an invalidation of data contained in IMC 134 corresponding to block 170 using block level bitmap 504 in SMU 136 because node 102 has requested an exclusive lock for that block 170. In addition, node 122 is performing an invalidation of data contained in IMC 134 corresponding to block 190 in temporary bitmap 504 because node 142 has requested an exclusive lock for that block 190. After the first invalidation process using block level bitmap 204 is complete, a background process merges the temporary bitmap 504 with the block level bitmap 204 to update the SMU 156. After the block level bitmap 204 has been unionized with temporary bitmap 504, the updated block level bitmap 204 has two blocks invalidated corresponding to blocks 170 and 190.

Updating in-Memory Data Structures During Commit

A transaction that is in the process of being committed is referred to herein as a commit-in-progress. According to one embodiment, a commit-in-progress has steps performed during a pre-commit phase. Pre-commit refers to a phase during a commit-in-progress, before changes made by a commit are available to other transactions in the database cluster.

An uncommitted transaction is tracked in a local private journal until commit. After receiving a commit, the committed transaction is pushed from the local private journal to the corresponding distributed global journals. However, only changes corresponding to data items contained in a local IMC can be recorded pre-commit in a local global journal. All other changes may be recorded in the other nodes global journals post-commit to avoid increasing the latency of the commit process.

FIG. 2B illustrates an example of the state of a cluster for a commit-in-progress during pre-commit. The SMUs 136, 156 contain block level invalidation bitmaps 204, 206 indicating invalidations of rows R1 and R2. The cluster may continue to operate with the SMUs having invalidations of rows R1 and R2 indefinitely. When a node 122 or 142 attempts to read data from an IMC but some of the data is invalid, the node may simply read that data from disk 160.

Figure 2C:
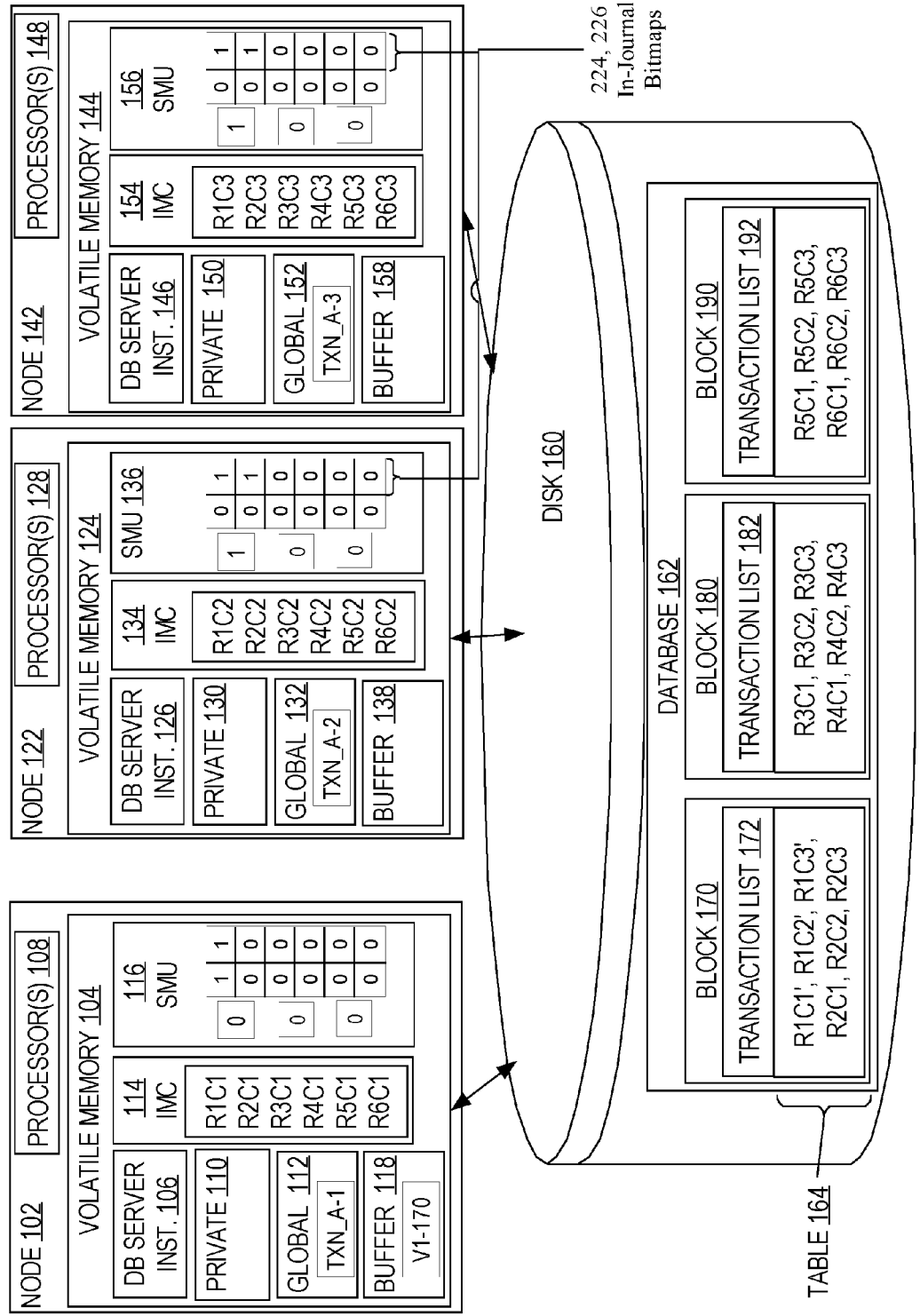
FIG. 2C is a block diagram illustrating a database cluster maintaining a current version of a database object distributed across the volatile memories of multiple nodes after a node that committed a modifying transaction propagates the modifications to other nodes with in-memory data affected by the modifications.

In some embodiments, changes that invalidate data from an IMC may be propagated to other nodes in the cluster. FIG. 2C illustrates an example of the state of a cluster post commit where the changes that invalidated blocks from an IMC are eventually propagated to the global journals of the nodes hosting those IMCs. Node 102 pushes updates to global journals 132, 152 at the block level. Thus, nodes 122, 142 update their own in-journal bitmaps 224, 226 respectively to indicate that each row in the corresponding block is updated in the corresponding global journal. In the example in FIG. 2C, there are two rows per block, so each in-journal bitmap 224, 226 contains two bits indicating that a change is located in a corresponding global journal.

In alternative embodiments, the bit vectors 202, 212, and 222 for SMU 116 in FIG. 2C can be copied in SMUs 136 and 156 post-commit. Because finer granularity changes are provided by node 102 to nodes 122 and 142, the nodes 122 and 142 may update their block level bitmaps 204, 206 to show no invalidations, and only record the actual invalidations in the row level bitmaps. Because the row-level bitmaps are a finer granularity than the block level bitmaps, in-journal bitmaps 224 and 226 may only require one row to be marked as in-journal.

Updating Local in-Memory Data Structures Pre-Commit

Any changes to data stored in an IMC that is local to a node may be recorded in a corresponding global journal maintained by that node, upon commit. These changes are immediately available via the local global journal to any transaction that accesses this data through the node with that local global journal.

FIG. 2B is an example of the state of a cluster during pre-commit after a node receives a commit for a modification of single row R1. In FIG. 2B, node 102 updates data items R1C1, R1C2, R1C3 to R1C1', R1C2', R1C3' from version V1-170. The modifications were stored in private journal 110 as TXN_A. After receiving a commit, node 102 pushes the modifications to the local global journal 112 as TXN_A-1, which is the portion of the transaction TXN_A that changed any data items corresponding to IMC 114 (i.e. R1C1 to R1C1'). In addition to pushing the updates to local global journal 112, the journaling is also recorded in the local SMU 116.

A node performing updates is aware of exactly what data items are being changed at the time of commit because only the final changes are pushed to the local global journal. Thus, the invalidations recorded in the local SMU may be made in the finest granularity bitmaps available. For example, node 102 records invalidations and in-journal updates in the row level bitmap 212 rather than the block level bit map 202 because node 102 has the exact changes being made at the time of commit.

Updating Remote in-Memory Data Structures Post-Commit

Remote data structures can be updated leisurely because stale IMCs are supplemented with data from disk. There is no pressure to immediately update the global journals corresponding to the remote IMCs because their data has already been invalidated when the corresponding shared locks were released. After commit, a node may push transaction data from a local private journal to a remote global journal. Transaction data may include one or more updated blocks. Alternatively, transaction data may include information necessary to update one or more blocks. A node may pull transaction data from a remote private journal to a local global journal. In either scenario, although the IMC is stale, the global journal provides up-to-date data after the transaction data has been transferred. Any node with an updated global journal may refer to the in-journal bitmaps in their corresponding SMUs to indicate that the global journal contains updated information for a particular block or row.

Continuing the example from FIG. 2B, FIG. 2C is an example embodiment of the state of a cluster after a node 102 pushes modifications from a committed transaction to the global journals located in the volatile memories of remote nodes 122, 142. The updates are pushed to the remote global journals 132, 152 responsible for tracking changes to remote data items R1C2 and R1C3. In addition to pushing the updates to remote global journals 132, 152, the journaling is also indicated in bitmaps 224, 226 in the remote SMUs 136, 156.

A transaction may involve writing many blocks that correspond to different IMCs located in different nodes. These changes may be aggregated on a per node basis, and sent to the corresponding node in batch messages. For example, if node 102 were to update rows R1 and R6 corresponding to blocks 170 and 190, then the updates could be sent in one message to node 122 and in another message to node 142. Batching updates in one or more messages reduces the cross-communication among nodes.

Age Out Cache Fusion Lock Back to Shared Locks

Figure 3C:
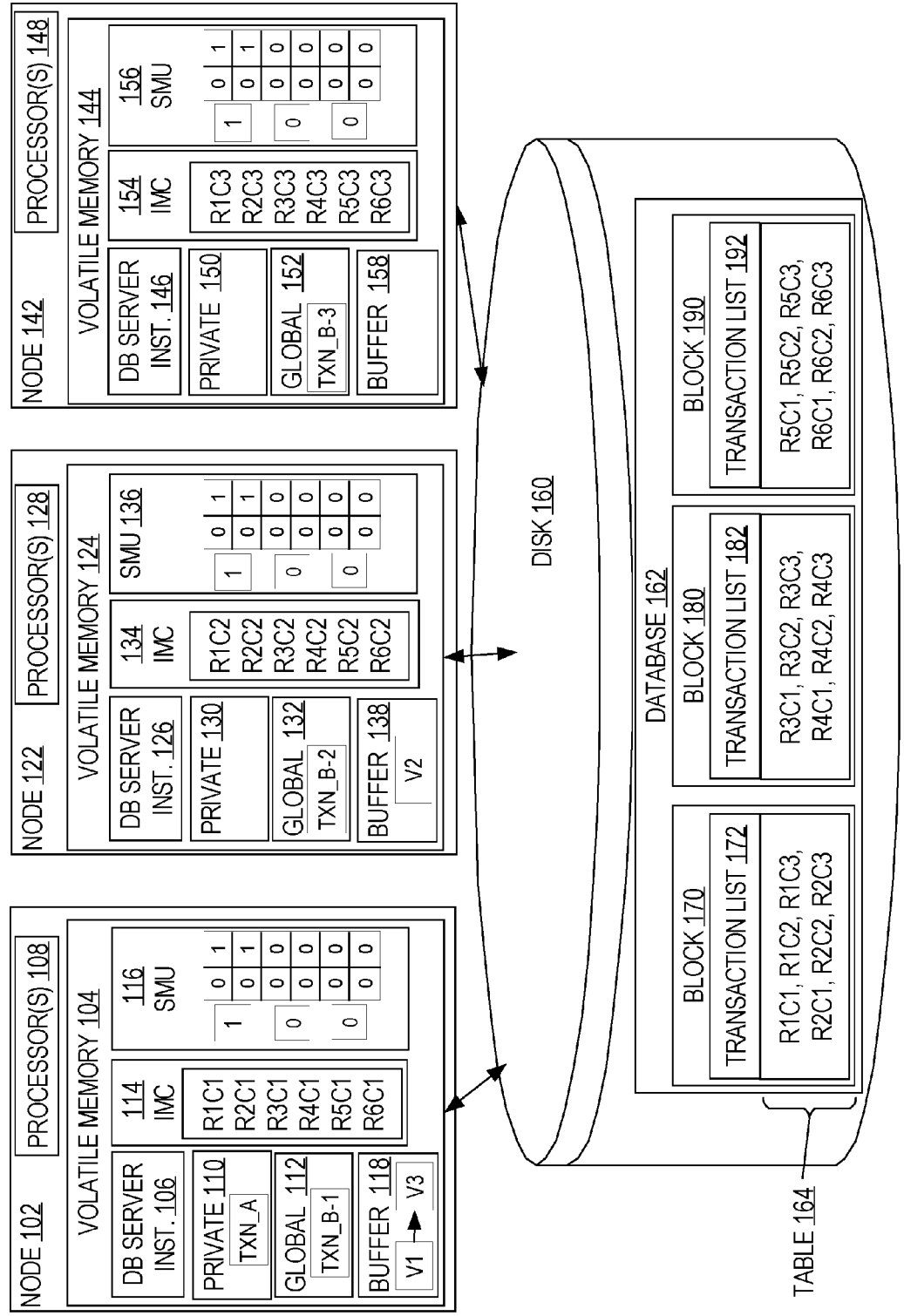
FIG. 3C is a block diagram illustrating a database cluster maintaining a current version of a database object distributed across the volatile memories of multiple nodes after a node that committed a modifying transaction propagates the modifications to other nodes with in-memory data affected by the modifications.

Access to data located in an updated global journal still requires a lock from the lock manager. If a "current" cache fusion lock is still held by a node in the cluster, the current version of the blocks covered by the lock should be written to disk before the cluster may benefit from the updated global journals. FIG. 3C is an example of the state of a cluster during post commit after a node 122 receives a commit for a modification of single row R1 of data. Node 122 has a version V2 of block 170 in a local buffer cache 138, but a more current version (i.e. V3) exists in node 102, and node 102 has an exclusive lock on that data. Node 122 may push changes from its local private journal 130 to one or more of global journals 112, 132, 152, but the node 122 may not necessarily access this data until a lock is granted to read this data.

After use of an exclusive lock is no longer necessary, the node that was using the exclusive lock may (1) send the exclusive lock to the next requesting node or (2) relegate the exclusive lock back to shared locks for the blocks protected by the exclusive lock. Relegating the exclusive lock to a set of shared locks may include writing all of the state information covered by the exclusive lock to disk. This state information may be important for other processes such as node recovery after a node failure.

In some embodiments, writing-to-disk the state information requires a separate lock from the lock manager. The lock manager responds to requests to write-to-disk by sending an exclusive lock for a write-to-disk operation. The requesting node is not necessarily the node that performs the write-to-disk operation. Instead, the lock manager may send an exclusive lock granting permission to write-to-disk to the node with the most current version of the locked data. The node that requests an exclusive lock for the write-to-disk operation is then sent a notification that a more current version of the data has been written to disk.

The node that last held an exclusive lock may hold it for a specified period of time before relegating back to shared locks. In addition, relegating the exclusive lock to shared locks may be triggered by other events such as the limited space in a buffer cache being used for other data.

FIG. 3D illustrates a cluster after node 102 and node 122 write their dirty buffers (i.e. buffers 118 and 138) to disk. Block 170 now contains modified data items R1C1", R1C2", R1C3", R2C1", R2C2", and R2C3". After a write-to-disk operation is complete, the associated cache fusion locks that require each node to hold state information regarding the blocks in their buffer cache are no longer needed. The exclusive lock is relegated to one or more shared locks. The blocks that were previously protected by an exclusive lock may be invalidated, but each IMC likely contains additional data that is valid. The process for subsequent reads includes scanning a private journal to apply transaction-specific information, and then scanning the corresponding local SMU to read portions of data from the local global journal, from the local IMC, or even from disk, depending on how the corresponding SMU maps out where the data is available.

Reads and Writes after Redundant Loading

Figure 6A:
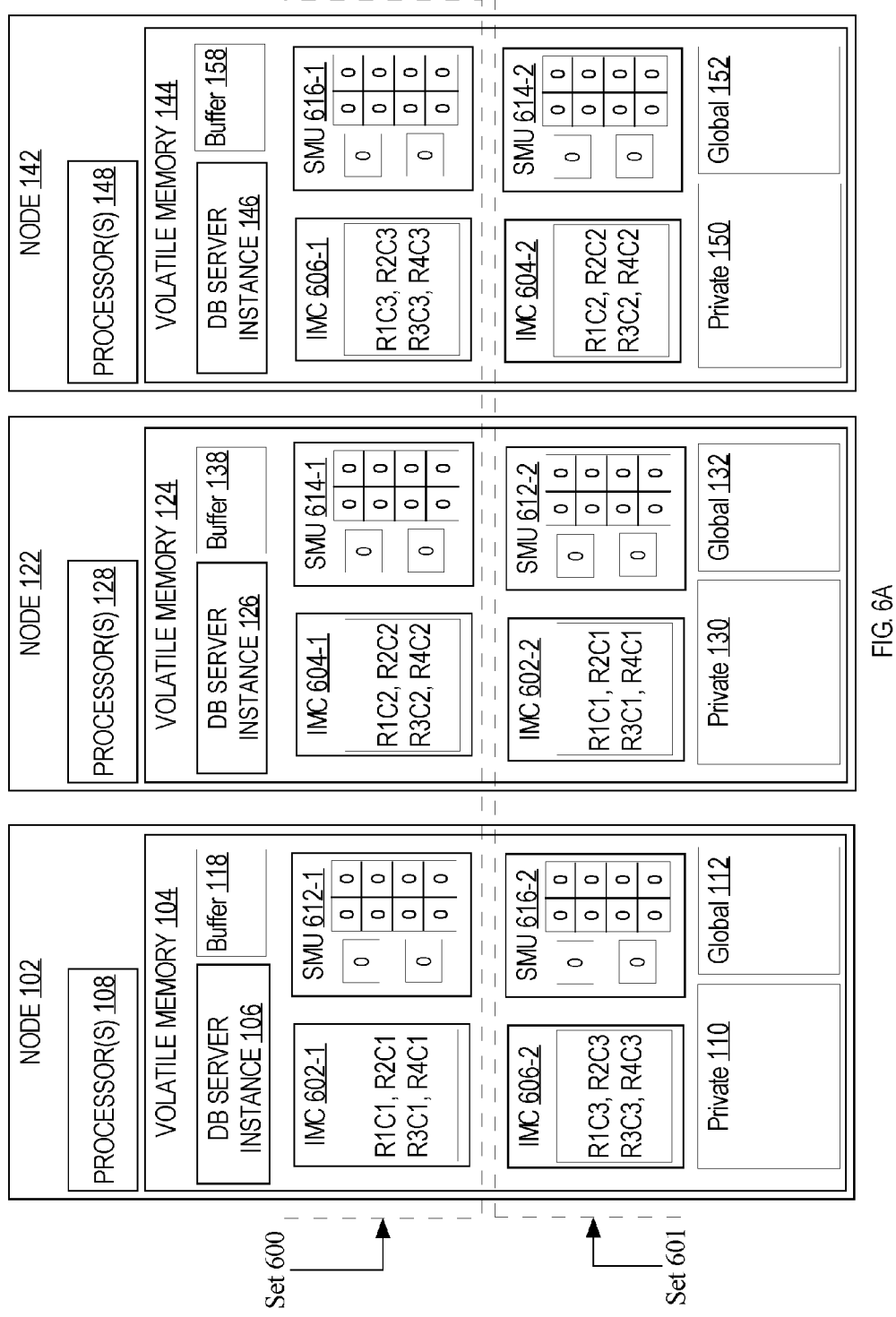
FIG. 6A is a block diagram illustrating a database cluster with a current version of a database object redundantly distributed across the volatile memories of multiple nodes.

In some embodiments, more than one node hosts the same chunk in an IMC. FIG. 6A is a block diagram illustrating a database cluster with copies of the same data distributed across two sets of IMCs. Each chunk is hosted by at least two different nodes:

IMC 602 is hosted by node 102 as IMC 602-1 in set 600 and by node 122 as IMC 602-2 in set 601

IMC 604 is hosted by node 122 as IMC 604-1 in set 600 and by node 142 as IMC 604-2 in set 601

IMC 606 is hosted by node 142 as IMC 606-1 in set 600 and by node 102 as IMC 606-2 in set 601

Private journals 110, 130, 150 and global journals 112, 132, 152 are created for each node 102, 122, 142. Additionally, each node 102, 122, 142 has a buffer cache 118, 138, 158. The disk 160, table 164, and associated blocks 170, 180, 190 are not shown to avoid cluttering the FIGS. 6A-6C.

When two nodes are executing database operations against IMCs containing the same chunk, shared locks may be granted over the data contained in the IMCs. Further, coordination between the nodes is not necessary when both database operations are read-only. However, when the two nodes are executing DMLs in parallel, each node acquires an exclusive lock that covers the data that may be modified. After each node receives a different exclusive lock, each node may break the given node's DML into work granules for execution against a specific set of IMCs.

For example, after a node 102 receives a first database operation that modifies a row in block 170, a second node 122 may receive a second database operation to modify a row in a different block 180. Node 102 breaks the work required to perform the first database operation into work granules that are distributed across the nodes 102, 122, 142, so work may be performed against IMCs as hosted in set 600. In parallel, node 122 breaks the work required to perform the second database operation into work granules that are distributed across the nodes 102, 122, 142, so work may be performed against IMCs as hosted in set 601.

Figure 6B:
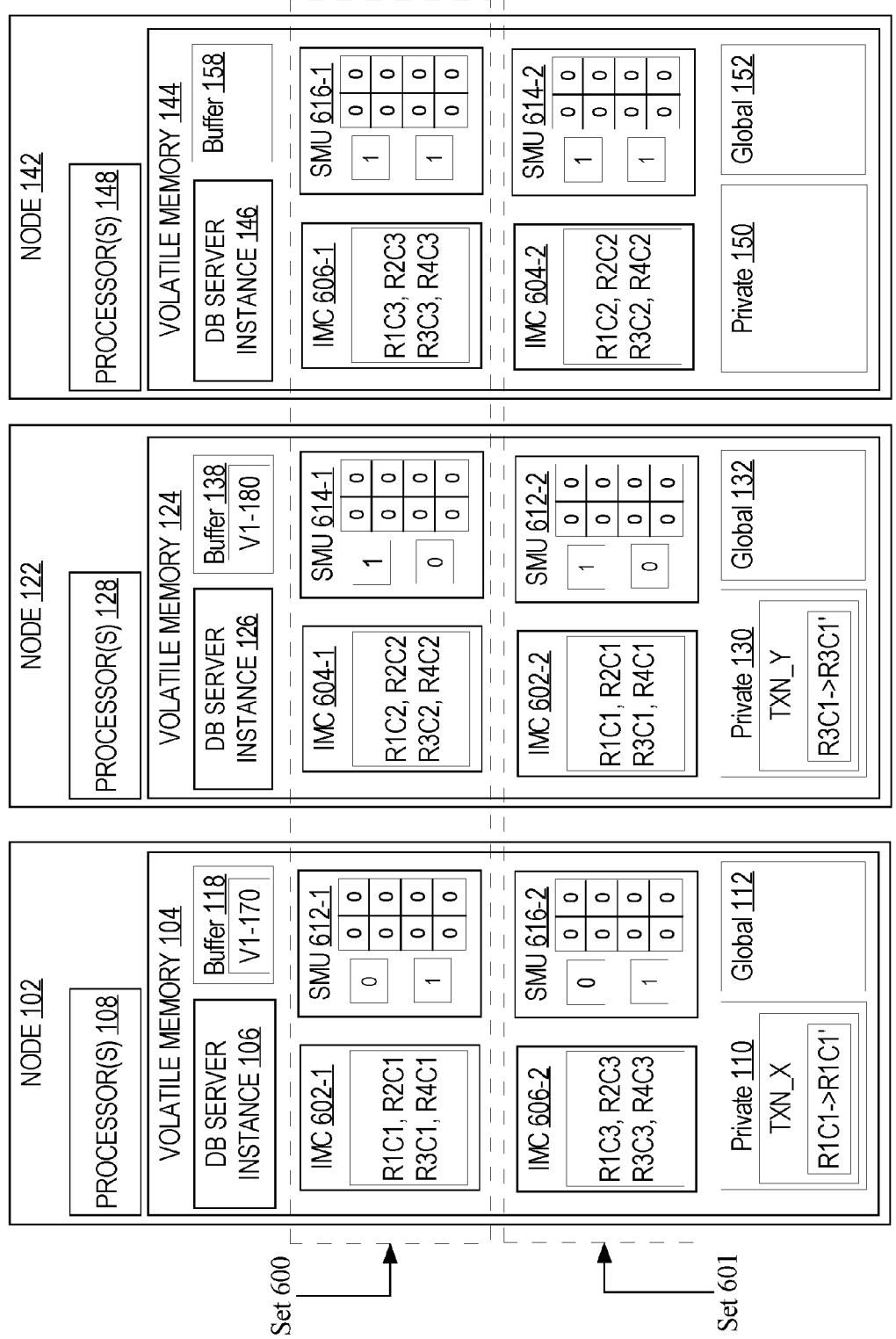
FIG. 6B is a block diagram illustrating a database cluster invalidating portions of a database object redundantly distributed across the volatile memories of multiple nodes after two different nodes obtain exclusive locks on different portions of the object for different modifying transactions.

FIG. 6B is a block diagram illustrating a database cluster invalidating portions of a database object redundantly distributed across the volatile memories of multiple nodes after two different nodes obtain exclusive locks on different portions of the object. Assume node 102 requests an exclusive lock to update data items from block 170 based on a first database operation in transaction TXN_X. The lock manager (i.e. node 102) informs the nodes 122, 142 that are not performing the update to release their shared locks. These nodes 122, 142 then invalidate the portion of their IMCs that correspond to the data covered by the exclusive lock. In this example, node 122 and node 142 invalidate the portions of IMCs 604-1, 602-2, 606-1, and 604-2 that correspond to block 170 because node 102 is acquiring an exclusive lock for that block. These invalidations are recorded in SMUs 614-1, 612-2, 616-1, and 614-2 respectively. The specifics of the transaction TXN_X are stored in private journal 110 represented as R1C1->R1C1' until commit.

Continuing the example, assume node 122 concurrently updates data items from block 180 based on a second database operation from TXN_Y. Node 102 and node 142 invalidate the portions of their IMCs 602-1, 606-2, 606-1, and 604-2 that correspond to block 180 because the lock manager informs those nodes 102, 142 to release their shared locks for that block. These invalidations are recorded in SMUs 612-1, 616-2, 616-1, and 614-2. The specifics of the transaction TXN_Y are stored in private journal 130 represented as R3C1->R3C1' until commit.

Note that different SMUs are used to record invalidations for each IMC, so the different sets 600, 601 of IMCs may be used in parallel. However, if any particular node is required to perform multiple invalidations in the same SMU, that particular node may create a temporary bitmap as described when explaining FIG. 5B. For example, node 142 invalidates multiple blocks in each SMU 616-1 and 614-2 because both node 102 and 122 are acquiring exclusive locks for data contained in IMCs 606-1 and 604-2. Node 142 may create two temporary bitmaps (not shown) for recording invalidations, and then merge those invalidations with the local SMUs 616-1 and 614-2.

Figure 6C:
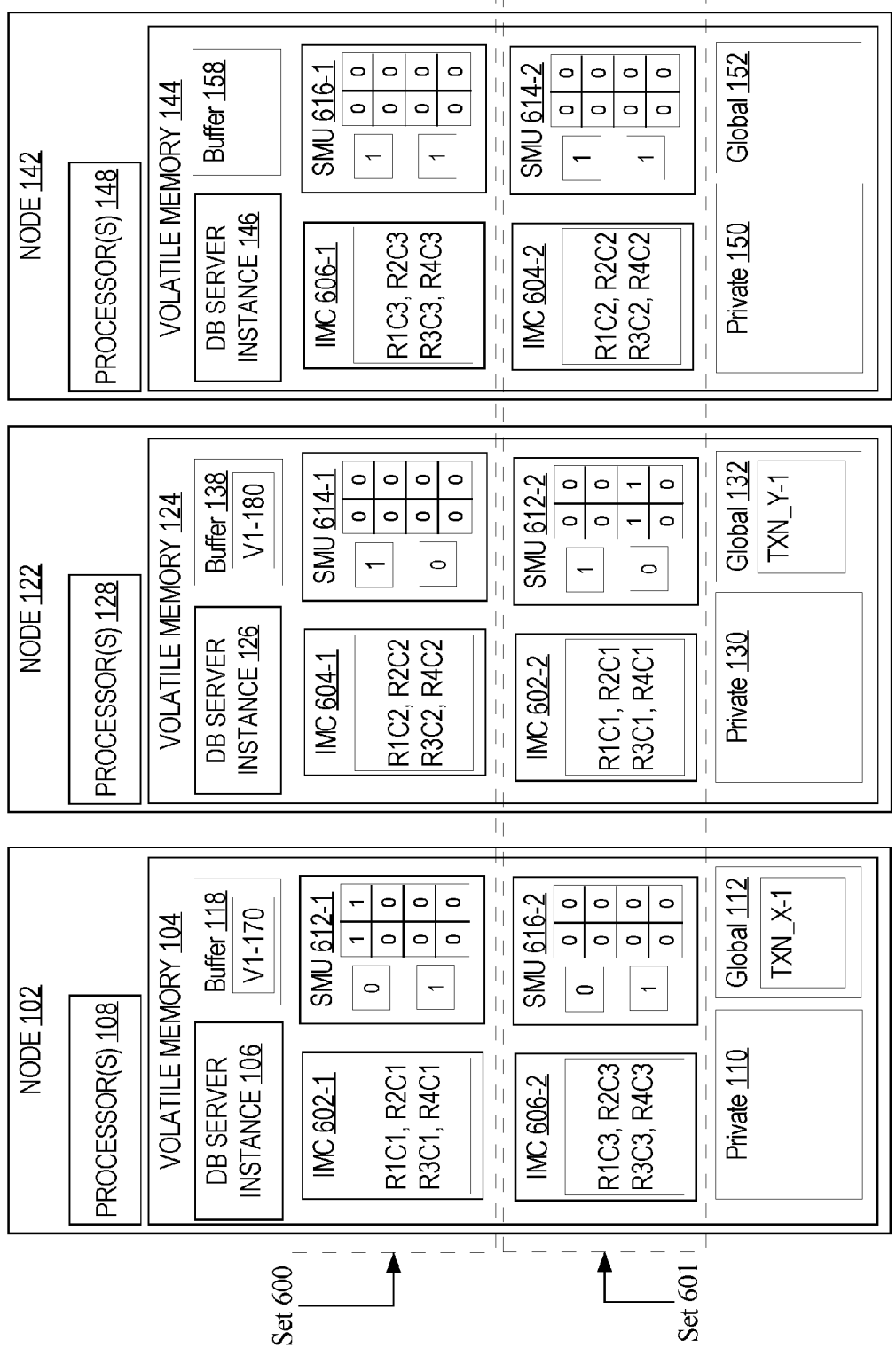
FIG. 6C is a block diagram illustrating a database cluster updating the current version of a database object redundantly distributed across the volatile memories of multiple nodes immediately after the two different modifying transactions have been committed.

FIG. 6C is a block diagram illustrating a database cluster updating the current version of a database object distributed across the volatile memories of multiple nodes immediately after two different modifying transactions have been committed. As illustrated in FIG. 6C, any nodes 102, 122 receiving a commit may commit their updates and push the updated data to their respective local global journals during pre-commit. Also, during pre-commit, the nodes 102, 122 receiving a commit invalidate the portions of their IMCs 602-1, 602-2 that correspond to the updated data. Node 102 records a row level invalidation for row R1 and flags an in-journal record in SMU 612-1 for the first database operation. Node 122 records a row level invalidation for row R3 and flags an in-journal record in SMU 612-2 for the second database operation.

For more information on redundant loading see U.S. patent application Ser. No. 14/805,949 filed Jul. 22, 2015, "FRAMEWORK FOR VOLATILE MEMORY DATABASE OPERATION EXECUTION IN A MULTI NODE CLUSTER," inventors Niloy Mukherjee et al. The entire contents of which is hereby incorporated by reference as if fully set forth herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
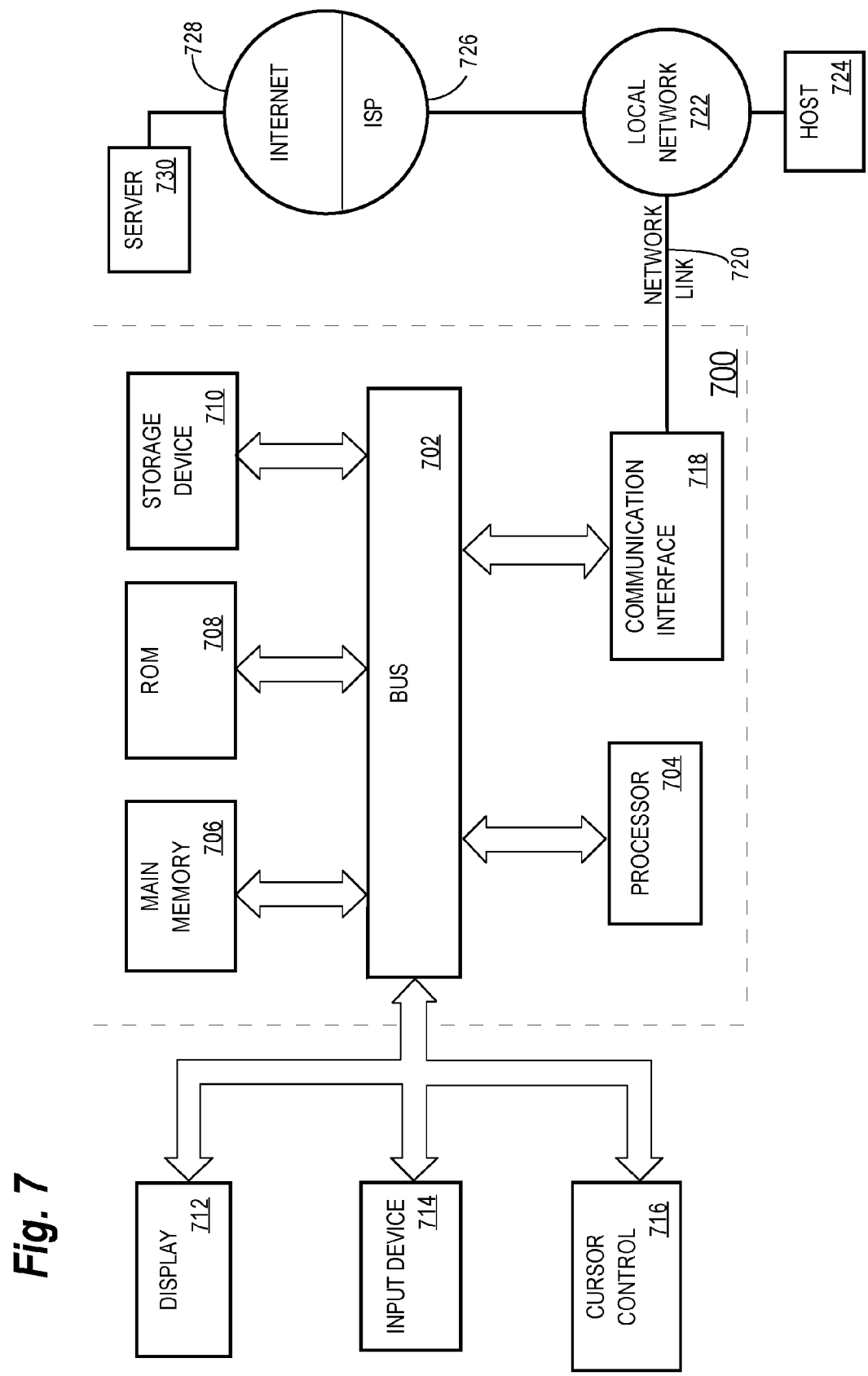
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining, in a persistent storage, a database that is accessible to a plurality of database server instances;
wherein the database includes a table that is physically organized in a plurality of units, wherein each unit of the plurality of units is stored in persistent storage and comprises one or more contiguous rows of the table stored in row-major format;
generating, in a first volatile memory local to a first database server instance of the plurality of database server instances, a first in-memory copy of a first chunk of the table;
wherein the first in-memory copy of the first chunk of the table comprises one or more columns from one or more units of the plurality of units in column-major format;
acquiring, by the first database server instance, a first lock that covers a particular unit of the one or more units;
receiving, at the first database server instance, a first request to release the first lock;
in response to receiving the first request, releasing the first lock, and
in response to releasing the first lock, storing, in the first volatile memory, a first indication that, within the first in-memory copy of the first chunk, data that is generated from the particular unit covered by the first lock is invalid;
the first database server instance responding to requests to read data from the first chunk by:
accessing the first indication;
obtaining data items, that belong to the first chunk and that are not identified as invalid by the first indication, from the first in-memory copy; and
obtaining data items, that belong to the first chunk and that are identified as invalid by the first indication, from a source other than the first in-memory copy;
wherein the method is performed by one or more computing devices.

2. The method of claim 1,
wherein each unit of the plurality of units is a block, wherein a given block comprises each column of two or more contiguous rows of the table stored in row-major format;
wherein the first lock covers the particular unit that is a particular block, wherein the first indication indicates that data in the first in-memory copy of the first chunk that is also generated from the particular block is invalid.

3. The method of claim 1,
wherein each unit of the plurality of units is a row of the table stored in row-major format;
wherein the first lock covers the particular unit that is a particular row, wherein the first indication indicates that a given row in the first in-memory copy of the first chunk that is also generated from the particular row is invalid.

4. The method of claim 1, wherein the first indication is stored in a first invalidation bitmap with one or more bits of the first invalidation bitmap corresponding to a respective unit used to generate the first in-memory copy.

5. The method of claim 4, the method further comprising:
determining the first invalidation bitmap is in use;
in response to determining the first invalidation bitmap is in use, creating a temporary invalidation bitmap for storing the first indication to enable a release of the first lock without requiring storing of the first indication in the first invalidation bitmap before the release; and
performing a union between of the first invalidation bitmap and the temporary invalidation bitmap to update the first invalidation bitmap.

6. The method of claim 1, the method further comprising:
prior to the first database server instance receiving the first request to release the first lock:
generating, in a second volatile memory local to a second database server instance of the plurality of database server instances, a second in-memory copy of a second chunk of the table, wherein the first chunk and the second chunk are generated from the same one or more units of the plurality of units;
acquiring, by the second database server instance, a second lock that covers the particular unit of the plurality of units, wherein both the first lock and the second lock are shared locks;
receiving, at the second database server instance, a second request to modify a particular row of the particular unit;
requesting, by the second database server instance, an exclusive lock that covers the particular unit;
after the first database server instance receives the first request to release the first lock:
acquiring, by the second database server instance, the exclusive lock that covers the particular unit of the plurality of units;
recording, by the second database server instance, a modification to the particular row of the particular unit;
committing the modification to the particular row of the particular unit;
in response to committing the modification, storing, in the second volatile memory, a second indication that a given row in the second in-memory copy that is also generated from the particular row is invalid;
the second database server instance responding to requests to read data from the second chunk by:
obtaining data items, that belong to the second chunk and that have not been invalidated in the second in-memory copy, from the second in-memory copy; and
obtaining data items, that belong to the second chunk and have been invalidated in the second in-memory copy, from at least one source other than the second in-memory copy.

7. The method of claim 6,
wherein the first indication and the second indication indicate invalidations at different levels of granularity.

8. The method of claim 6, wherein the second database server instance additionally stores, in response to the committing of the modification, an up-to-date unit that indicates the modification, and provides the up-to-date unit to the first database server instance.

9. The method of claim 6, wherein the second in-memory copy of the second chunk of the table comprises a different one or more columns from the same one or more units of the plurality of units than the first in-memory copy of the first chunk of the table.

10. The method of claim 6, wherein the second in-memory copy of the second chunk of the table comprises the same one or more columns from the same one or more units of the plurality of units as the first in-memory copy of the first chunk of the table.

11. The method of claim 6, the method further comprising:
prior to the second database server instance receiving the second request to modify the particular row of the particular unit:
generating, in a third volatile memory local to a third database server instance of the plurality of database server instances, a third in-memory copy of a third chunk of the table, wherein the first chunk, second chunk, and the third chunk are generated from the same one or more units of the plurality of units;
acquiring, by the third database server instance, a third lock that covers the particular unit of the plurality of units, wherein both the first lock and the third lock are shared locks;
after the second database server instance receives the second request to modify the particular row of the particular unit:
receiving, at the third database server instance, a third request to release the third lock;
in response to receiving the third request, releasing the third lock, and
in response to releasing the third lock, storing, in the third volatile memory, a third indication that data in the third in-memory copy of the third chunk that is also generated from the particular unit is invalid;
the third database server instance responding to requests to read data from the third chunk by:
obtaining data items, that belong to the third chunk and that have not been invalidated in the third in-memory copy, from the third in-memory copy; and
obtaining data items, that belong to the third chunk and have been invalidated in the third in-memory copy, from a source other than the third in-memory copy.

12. One or more non-transitory computer-readable media storing instructions that, when executed by one or more hardware processors, cause performance of:
maintaining, in a persistent storage, a database that is accessible to a plurality of database server instances;
wherein the database includes a table that is physically organized in a plurality of units, wherein each unit of the plurality of units is stored in persistent storage and comprises one or more contiguous rows of the table stored in row-major format;
generating, in a first volatile memory local to a first database server instance of the plurality of database server instances, a first in-memory copy of a first chunk of the table;
wherein the first in-memory copy of the first chunk of the table comprises one or more columns from one or more units of the plurality of units in column-major format;
acquiring, by the first database server instance, a first lock that covers a particular unit of the one or more units;
receiving, at the first database server instance, a first request to release the first lock;
in response to receiving the first request, releasing the first lock, and
in response to releasing the first lock, storing, in the first volatile memory, a first indication that, within the first in-memory copy of the first chunk, data that is generated from the particular unit covered by the first lock is invalid;

the first database server instance responding to requests to
read data from the first chunk by:
accessing the first indication;
obtaining data items, that belong to the first chunk and
that are not identified as invalid by the first indication, from the first in-memory copy; and
obtaining data items, that belong to the first chunk and
that are identified as invalid by the first indication,
from a source other than the first in-memory copy.

13. The one or more non-transitory computer-readable
media of claim 12,
wherein each unit of the plurality of units is a block,
wherein a given block comprises each column of two or
more contiguous rows of the table stored in row-major
format;
wherein the first lock covers the particular unit that is a
particular block, wherein the first indication indicates
that data in the first in-memory copy of the first chunk
that is also generated from the particular block is
invalid.

14. The one or more non-transitory computer-readable
media of claim 12,
wherein each unit of the plurality of units is a row of the
table stored in row-major format;
wherein the first lock covers the particular unit that is a
particular row, wherein the first indication indicates
that a given row in the first in-memory copy of the first
chunk that is also generated from the particular row is
invalid.

15. The one or more non-transitory computer-readable
media of claim 12, wherein the first indication is stored in a
first invalidation bitmap with one or more bits of the first
invalidation bitmap corresponding to a respective unit used
to generate the first in-memory copy.

16. The one or more non-transitory computer-readable
media of claim 15, wherein the instructions, when executed
by the one or more hardware processors further cause
performance of:
determining the first invalidation bitmap is in use;
response to determining the first invalidation bitmap is in
use, creating a temporary invalidation bitmap for storing the first indication to enable a release of the first
lock without requiring storing of the first indication in
the first invalidation bitmap before the release; and
performing a union between of the first invalidation
bitmap and the temporary invalidation bitmap to update
the first invalidation bitmap.

17. The one or more non-transitory computer-readable
media of claim 12, wherein the instructions, when executed
by the one or more hardware processors further cause
performance of:
prior to the first database server instance receiving the first
request to release the first lock:
generating, in a second volatile memory local to a
second database server instance of the plurality of
database server instances, a second in-memory copy
of a second chunk of the table, wherein the first
chunk and the second chunk are generated from the
same one or more units of the plurality of units;
acquiring, by the second database server instance, a
second lock that covers the particular unit of the
plurality of units, wherein both the first lock and the
second lock are shared locks;
receiving, at the second database server instance, a
second request to modify a particular row of the
particular unit;
requesting, by the second database server instance, an
exclusive lock that covers the particular unit;
after the first database server instance receives the first
request to release the first lock:
acquiring, by the second database server instance, the
exclusive lock that covers the particular unit of the
plurality of units;
recording, by the second database server instance, a
modification to the particular row of the particular
unit;
committing the modification to the particular row of the
particular unit;
in response to committing the modification, storing, in
the second volatile memory, a second indication that
a given row in the second in-memory copy that is
also generated from the particular row is invalid;
the second database server instance responding to
requests to read data from the second chunk by:
obtaining data items, that belong to the second chunk
and that have not been invalidated in the second
in-memory copy, from the second in-memory
copy; and
obtaining data items, that belong to the second chunk
and have been invalidated in the second
in-memory copy, from at least one source other
than the second in-memory copy.

18. The one or more non-transitory computer-readable
media of claim 17, wherein the first indication and the
second indication indicate invalidations at different levels of
granularity.

19. The one or more non-transitory computer-readable
media of claim 17, wherein the instructions, when executed
by the one or more hardware processors further cause
performance of:
the second database server instance additionally storing,
in response to the committing of the modification, an
up-to-date unit that indicates the modification, and
providing the up-to-date unit to the first database server
instance.

20. The one or more non-transitory computer-readable
media of claim 17, wherein the second in-memory copy of
the second chunk of the table comprises a different one or
more columns from the same one or more units of the
plurality of units than the first in-memory copy of the first
chunk of the table.

21. The one or more non-transitory computer-readable
media of claim 17, wherein the second in-memory copy of
the second chunk of the table comprises the same one or
more columns from the same one or more units of the
plurality of units as the first in-memory copy of the first
chunk of the table.

22. The one or more non-transitory computer-readable
media of claim 17, wherein the instructions, when executed
by the one or more hardware processors further cause
performance of:
prior to the second database server instance receiving the
second request to modify the particular row of the
particular unit:
generating, in a third volatile memory local to a third
database server instance of the plurality of database
server instances, a third in-memory copy of a third
chunk of the table, wherein the first chunk, second
chunk, and the third chunk are generated from the
same one or more units of the plurality of units;

acquiring, by the third database server instance, a third lock that covers the particular unit of the plurality of units, wherein both the first lock and the third lock are shared locks;

after the second database server instance receives the second request to modify the particular row of the particular unit:

receiving, at the third database server instance, a third request to release the third lock;

in response to receiving the third request, releasing the third lock, and in response to releasing the third lock, storing, in the third volatile memory, a third indication that data in the third in-memory copy of the third chunk that is also generated from the particular unit is invalid;

the third database server instance responding to requests to read data from the third chunk by:

obtaining data items, that belong to the third chunk and that have not been invalidated in the third in-memory copy, from the third in-memory copy; and obtaining data items, that belong to the third chunk and have been invalidated in the third in-memory copy, from a source other than the third in-memory copy.

* * * * *

UNITED STATES PATENT AND TRADEMARK OFFICE
CERTIFICATE OF CORRECTION

PATENT NO. : 10,216,781 B2
APPLICATION NO. : 14/983496
DATED : February 26, 2019
INVENTOR(S) : Hase et al.

Page 1 of 1

It is certified that error appears in the above-identified patent and that said Letters Patent is hereby corrected as shown below:

On the Title Page

Column 2, under Abstract, Line 8, delete "store" and insert -- stored --, therefor.

In the Claims

In Column 21, Line 41, in Claim 16, delete "response" and insert -- in response --, therefor.

Signed and Sealed this
Twenty-eighth Day of January, 2020

Andrei Iancu
*Director of the United States Patent and Trademark Office*